US008498765B2

(12) United States Patent
Tajima et al.

(10) Patent No.: US 8,498,765 B2
(45) Date of Patent: Jul. 30, 2013

(54) CONTROL DEVICE

(75) Inventors: Yoichi Tajima, Anjo (JP); Yomei Hakumura, Toyokawa (JP); Takashi Yoshida, Anjo (JP)

(73) Assignee: Aisin AW Co., Ltd., Anjo-Shi (JP)

( * ) Notice: Subject to any disclaimer, the term of this patent is extended or adjusted under 35 U.S.C. 154(b) by 56 days.

(21) Appl. No.: 13/240,065

(22) Filed: Sep. 22, 2011

(65) Prior Publication Data

US 2012/0078457 A1    Mar. 29, 2012

(30) Foreign Application Priority Data

Sep. 29, 2010    (JP) ................................ 2010-219930

(51) Int. Cl.
*B60L 9/00* (2006.01)
*B60K 1/00* (2006.01)
*B60K 6/20* (2007.10)
*H02P 1/00* (2006.01)

(52) U.S. Cl.
USPC .......... 701/22; 180/65.1; 180/65.21; 318/440

(58) Field of Classification Search
USPC .......................................................... 701/22
See application file for complete search history.

(56) References Cited

U.S. PATENT DOCUMENTS

| | | | |
|---|---|---|---|
| 6,581,705 B2 * | 6/2003 | Phillips et al. ............. | 180/65.25 |
| 7,028,795 B2 * | 4/2006 | Tabata ....................... | 180/65.21 |
| 7,273,120 B2 * | 9/2007 | Tabata ....................... | 180/65.265 |
| 7,360,616 B2 * | 4/2008 | Schiele ..................... | 180/65.265 |
| 7,395,888 B2 * | 7/2008 | Yamamoto et al. ........ | 180/65.29 |
| 7,686,112 B2 * | 3/2010 | Shiiba ....................... | 180/65.275 |
| 2006/0243501 A1 | 11/2006 | Hidaka | |
| 2006/0247086 A1 * | 11/2006 | Watanabe et al. ............ | 475/208 |
| 2007/0278022 A1 * | 12/2007 | Tanishima ................... | 180/65.2 |
| 2009/0105918 A1 * | 4/2009 | Kobayashi et al. ............ | 701/67 |

(Continued)

FOREIGN PATENT DOCUMENTS

| | | |
|---|---|---|
| JP | A-11-150805 | 6/1999 |
| JP | A-2006-306325 | 11/2006 |

(Continued)

OTHER PUBLICATIONS

International Search Report issued in International Patent Application No. PCT/JP2011/072067; mailed Nov. 22, 2011; with English-language translation.

(Continued)

*Primary Examiner* — Thomas Black
*Assistant Examiner* — Tyler Paige
(74) *Attorney, Agent, or Firm* — Oliff & Berridge, PLC

(57) ABSTRACT

A control device configured with a first control portion controls an engagement pressure of a first engagement device to make a rotational speed of the input member equal to a predetermined rotational speed during the specific electric power generation control. A second control portion controls an engagement pressure of the second engagement device in such a manner as to make a transfer torque capacity of the second engagement device equal to a predetermined transfer torque capacity during the specific electric power generation control. Another control portion determines a target rotational speed in such a manner as to maintain a state in which an electric power generation amount achieved by the rotating electrical machine coincides with a predetermined target electric power generation amount, in accordance with a magnitude of a differential torque as a difference between a torque transmitted via the first engagement device.

8 Claims, 11 Drawing Sheets

U.S. PATENT DOCUMENTS

| | | | |
|---|---|---|---|
| 2009/0143950 A1* | 6/2009 | Hasegawa et al. ............. 701/68 |
| 2009/0234524 A1* | 9/2009 | Kim ................................. 701/22 |
| 2011/0039655 A1 | 2/2011 | Kaltenbach et al. | |

FOREIGN PATENT DOCUMENTS

| | | |
|---|---|---|
| JP | A 2006-306328 | 11/2006 |
| JP | A-2007-314097 | 12/2007 |
| JP | A-2008-7094 | 1/2008 |
| JP | A-2008-062688 | 3/2008 |
| JP | A-2008-222222 | 9/2008 |
| JP | A-2009-255876 | 11/2009 |
| JP | A 2010-143306 | 7/2010 |
| JP | A-2010-155590 | 7/2010 |
| JP | A-2010-202151 | 9/2010 |
| JP | A 2011-020542 | 2/2011 |
| JP | A-2011-025811 | 2/2011 |
| JP | A-2011-031659 | 2/2011 |
| JP | A 2011-507746 | 3/2011 |
| WO | WO 2009/074480 A1 | 6/2009 |

OTHER PUBLICATIONS

Jul. 5, 2011 International Search Report issued in International Patent Application No. PCT/JP2011/058091; with English-language translation.

Jun. 28, 2011 International Search Report issued in International Patent Application No. PCT/JP2011/058089; with English-language translation.

* cited by examiner

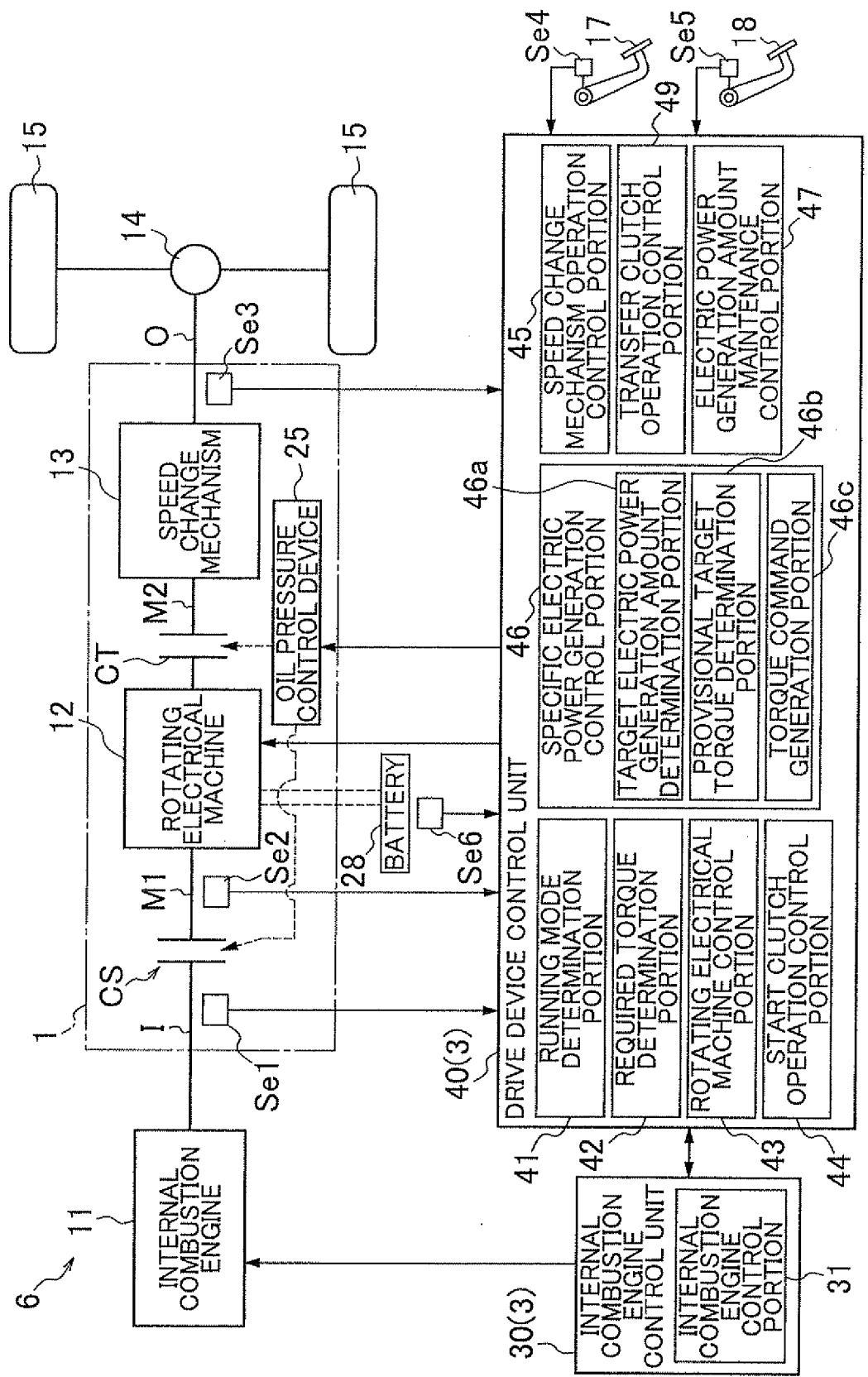

CONTROL DEVICE

INCORPORATION BY REFERENCE

The disclosure of Japanese Patent Application No. 2010-219930 filed on Sep. 29, 2010 including the specification, drawings and abstract is incorporated herein by reference in its entirety.

BACKGROUND OF THE INVENTION

1. Field of the Invention

The present invention relates to a control device designed to control a vehicular drive device that has a rotating electrical machine provided in a drive train path connecting an input member drivingly coupled to an internal combustion engine with an output member drivingly coupled to wheels, has a first engagement device provided between the input member and the rotating electrical machine, and has a second engagement device provided between the rotating electrical machine and the output member.

2. Description of the Related Art

As a control device as described above, there is already known a device described in Japanese Patent Application Publication No. 2008-7094 mentioned below. This control device is designed to control a drive device for a hybrid vehicle of a so-called one motor parallel type. This control device causes the vehicle to run while transmitting to an output member (a propeller shaft) a torque of an internal combustion engine (an engine) transmitted to an input member when both a first engagement device (a first clutch in Japanese Patent Application Publication No. 2008-7094; the same will hold true hereinafter) and a second engagement device (a second clutch) are in a slip engagement state in a CL2 overheat mode (a kind of WSC running mode) in Japanese Patent Application Publication No. 2008-7094. It should be noted that in this control device, the second engagement device is subjected to torque control so as to transmit a required torque needed to cause the vehicle to run, and a rotating electrical machine is subjected to rotational speed control on the basis of a predetermined target rotational speed.

In the control device of Japanese Patent Application Publication No. 2008-7094, the control for causing the rotating electrical machine (a motor-generator) to carry out electric power generation using part of the torque of the internal combustion engine may be performed, for example, when a storage amount of a storage device is small. In this case, the internal combustion engine is so controlled as to output a torque equivalent to a sum of the required torque and a torque needed for electric power generation by the rotating electrical machine. At this time, an electric power generation amount achieved by the rotating electrical machine is determined on the basis of a differential torque as a difference between an output torque of the internal combustion engine transmitted to the rotating electrical machine side via the first engagement device and a torque transmitted to wheel side via the second engagement device and a target rotational speed of the rotating electrical machine subjected to rotational speed control.

However, in real control, the output torque of the internal combustion engine and a transfer torque capacity of the second engagement device do not always completely coincide with their control target values, and inevitably vary to a certain extent. Then, when such variations occur, the aforementioned differential torque fluctuates greatly, so that the electric power generation amount achieved by the rotating electrical machine may also fluctuate greatly.

SUMMARY OF THE INVENTION

It is an object of the invention to realize a control device capable of maintaining an electric power generation amount achieved by a rotating electrical machine substantially constant within a predetermined range even in the case where the magnitude of a torque transmitted via a first engagement device or the magnitude of a torque transmitted via a second engagement device varies.

An aspect of the invention relates to a control device which is designed to control a vehicular drive device that has a rotating electrical machine provided in a drive train path connecting an input member drivingly coupled to an internal combustion engine with an output member drivingly coupled to wheels, has a first engagement device provided between the input member and the rotating electrical machine, and has a second engagement device provided between the rotating electrical machine and the output member. The control device is structured to be able to perform specific electric power generation control for causing the rotating electrical machine to carry out electric power generation when both the first engagement device and the second engagement device are in a slip engagement state. The control device is equipped with a first engagement device operation control portion that controls an engagement pressure of the first engagement device in such a manner as to make a rotational speed of the input member equal to a predetermined rotational speed during the specific electric power generation control, a second engagement device operation control portion that controls an engagement pressure of the second engagement device in such a manner as to make a transfer torque capacity of the second engagement device equal to a predetermined transfer torque capacity during the specific electric power generation control, and a rotating electrical machine control portion that determines a target rotational speed in such a manner as to maintain a state in which an electric power generation amount achieved by the rotating electrical machine coincides with a predetermined target electric power generation amount, in accordance with a magnitude of a differential torque as a difference between a torque transmitted via the first engagement device and a torque transmitted via the second engagement device, in performing rotational speed control for causing a rotational speed of the rotating electrical machine to follow the target rotational speed by issuing a command of the target rotational speed to the rotating electrical machine during the specific electric power generation control.

It should be noted that the term "drivingly coupled" means a state in which two rotary elements are coupled to each other such that a driving force can be transmitted therebetween, and is used as a concept including a state in which the two rotary elements are so coupled to each other as to rotate together with each other or a state in which the two rotary elements are coupled to each other such that a driving force can be transmitted therebetween via one or two or more transmission members. Such transmission members include various members that transmit rotation with the speed thereof unchanged or changed, for example, shafts, gear mechanisms, belts, chains, and the like. Further, such transmission members may include engagement devices that selectively transmit rotation and a driving force, for example, friction clutches and the like. It should be noted herein that the term "driving force" is used in the same meaning as "torque".

Further, the term "rotating electrical machine" is used as a concept including all of a motor (an electric motor), a generator (an electric power generator), and a motor-generator that performs the functions of both a motor and a generator according to need.

Further, the term "slip engagement state" means a state in which one rotary member of a relevant engagement device and the other rotary member thereof are engaged with each other with a difference in rotational speed therebetween.

According to the aforementioned aspect, the engagement pressure of the first engagement device is so controlled as to make the rotational speed of the input member equal to the predetermined rotational speed. Therefore, the torque of the internal combustion engine transmitted to the input member can be transmitted to the rotating electrical machine side via the first engagement device. Further, the engagement pressure of the second engagement device is so controlled as to make the transfer torque capacity of the second engagement device equal to the predetermined transfer torque capacity. Therefore, a torque equal in magnitude to this predetermined transfer torque capacity can be transmitted from the rotating electrical machine side to the wheel side via the second engagement device. In consequence, out of the torque transmitted to the rotating electrical machine side via the first engagement device, the torque equal in magnitude to the transfer torque capacity of the second engagement device can be transmitted to the output member side via the second engagement device. Thus, a desired torque can be transmitted to the output member side. At this time, since the rotating electrical machine is subjected to rotational speed control on the basis of the target rotational speed, the electric power generation amount achieved by the rotating electrical machine is determined in accordance with the magnitude of the differential torque as the difference between the torque transmitted via the first engagement device and the torque transmitted via the second engagement device. Besides, in the aspect of the present invention, the rotating electrical machine control portion determines the target rotational speed in rotational speed control of the rotating electrical machine in accordance with the magnitude of the differential torque, so that the state in which the electric power generation amount achieved by the rotating electrical machine coincides with the predetermined target electric power generation amount can be maintained. Accordingly, it is possible to provide a control device capable of maintaining an electric power generation amount substantially constant within a predetermined range even in the case where the magnitude of a torque transmitted via a first engagement device or the magnitude of a torque transmitted via a second engagement device varies, while maintaining the rotational speed of an input member at a predetermined rotational speed and transmitting a desired torque to an output member.

The control device may be equipped with a provisional target torque determination portion that determines a provisional target torque to be output by the rotating electrical machine on a basis of the target electric power generation amount and a preset provisional target rotational speed of the rotating electrical machine, and an internal combustion engine torque command generation portion that generates an internal combustion engine torque command as such a command as to make an output torque of the internal combustion engine coincide with a sum of a required torque needed to cause a vehicle to run and an absolute value of the provisional target torque during the specific electric power generation control.

According to this structure, the internal combustion engine can be caused to output the torque coincident with the sum of the absolute value of the provisional target torque to be output by the rotating electrical machine and the required torque needed to cause the vehicle to run, on the basis of the internal combustion engine torque command generated by the internal combustion engine torque command generation portion. In consequence, the rotating electrical machine can be caused to generate the electric power in the target electric power generation amount while fulfilling the required torque.

Further, the provisional target rotational speed may be set to a value within such a rotational speed range that a heat generation amount of the rotating electrical machine per unit time becomes equal to or smaller than a predetermined value set in advance.

According to this structure, the heat generation amount of the rotating electrical machine per unit time is maintained equal to or smaller than the predetermined value, and the rotating electrical machine is easily caused to continuously generate the electric power in the target electric power generation amount without being overheated for a long time.

Further, the rotating electrical machine control portion may determine the target rotational speed through feedback control based on a deviation of an actual electric power generation amount achieved by the rotating electrical machine from the target electric power generation amount.

According to this structure, the target rotational speed is determined through feedback control based on the deviation of the actual electric power generation amount from the target electric power generation amount, and the state in which the electric power generation amount achieved by the rotating electrical machine coincides with the predetermined target electric power generation amount can be appropriately maintained.

Further, the rotating electrical machine control portion may determine the target rotational speed corresponding to the magnitude of the differential torque and the target electric power generation amount on a basis of a map or relational expression prescribing a relationship among the magnitude of the differential torque, the target electric power generation amount, and the target rotational speed.

According to this structure, the target rotational speed corresponding to the magnitude of the differential torque and the target electric power generation amount is determined on the basis of the predetermined map or the predetermined relational expression, and the state in which the electric power generation amount achieved by the rotating electrical machine coincides with the predetermined target electric power generation amount can be appropriately maintained.

Further, the specific electric power generation control may be performed at least in a low-vehicle-speed charge requirement state in which a storage amount of a storage device is equal to or smaller than a predetermined charge requirement criterial threshold and a rotational speed of the output member is equal to or lower than a predetermined low vehicle speed criterial threshold determined on a basis of a preset provisional target rotational speed of the rotating electrical machine.

There is a strong demand that the rotating electrical machine be caused to carry out electric power generation and the electric power generation amount achieved by the rotating electrical machine be maintained equal to or larger than a predetermined amount when the storage amount of the storage device is equal to or smaller than the predetermined charge requirement criterial threshold. In this case, especially when the rotational speed of the output member is equal to or lower than the predetermined low vehicle speed criterial threshold determined on the basis of the provisional target rotational speed of the rotating electrical machine, the difference in rotational speed between the rotational speed of the input member and the rotational speed of the output member is relatively large. Therefore, there is a strong demand that the rotating electrical machine be caused to carry out electric power generation when both the first engagement device and the second engagement device are in the slip engagement state.

According to this structure, specific electric power generation control is performed at least in the low-vehicle-speed charge requirement state, and the first engagement device operation control portion, the second engagement device operation control portion, and the rotating electrical machine control portion are caused to perform the functions as described hitherto during the specific electric power generation control. The electric power generation amount achieved by the rotating electrical machine can thereby be maintained within the predetermined range while appropriately causing the rotating electrical machine to carry out electric power generation when both the first engagement device and the second engagement device are in the slip engagement state. In consequence, the aforementioned demands in the low-vehicle-speed charge requirement state can be appropriately satisfied.

Further, the specific electric power generation control may be performed at least in a low temperature state in which a temperature of a storage device is equal to or lower than a predetermined low temperature criterial threshold set on a basis of an internal resistance of the storage device.

In general, the internal resistance of the storage device has the property of increasing as the temperature falls. Then, in a state where the temperature of the storage device is equal to or lower than the predetermined low temperature criterial threshold, the internal resistance is higher than that at room temperatures. The range of the magnitude of the instantaneously chargeable/dischargeable electric power permitted for the storage device is narrow. In this case, when the actual electric power generation amount of the rotating electrical machine becomes excessive with respect to the target electric power generation amount. When the range of the chargeable electric power is exceeded as a result of the excess, the performance of the storage device may be deteriorated. Thus, there is a strong demand that the electric power generation amount achieved by the rotating electrical machine be maintained at a predetermined amount to the maximum possible extent in the state where the temperature of the storage device is equal to or lower than the predetermined low temperature criterial threshold.

According to this structure, specific electric power generation control is performed at least in the low temperature state, and the first engagement device operation control portion, the second engagement device operation control portion, and the rotating electrical machine control portion are caused to perform the functions as described hitherto during the specific electric power generation control. The electric power generation amount achieved by the rotating electrical machine can thereby be appropriately maintained substantially constant within the predetermined range. In consequence, the aforementioned demand in the low temperature state can be appropriately satisfied.

Further, the target electric power generation amount may be set on a basis of at least one of a storage amount of a storage device and an electric power consumption by an auxiliary installed in a vehicle.

For example, it is desired that the electric power generation amount achieved by the rotating electrical machine be increased as the storage amount of the storage device decreases, with a view to recovering the storage amount. Further, it is desired, for example, that the electric power generation amount achieved by the rotating electrical machine be increased as the electric power consumption by the auxiliary installed in the vehicle increases, with a view to sufficiently compensating for the electric power consumption.

According to this structure, the target electric power generation amount achieved by the rotating electrical machine can be appropriately set, by taking into account at least one of the storage amount of the storage device and the electric power consumption by the auxiliary installed in the vehicle.

BRIEF DESCRIPTION OF THE DRAWINGS

FIG. 9 is a schematic view showing overall structures of a vehicular drive device and a control device for the vehicular drive device according to still another embodiment of the present invention.

DETAILED DESCRIPTION OF THE EMBODIMENTS

An embodiment of a control device according to the present invention will be described with reference to the drawings. A control device 3 according to the present embodiment is a control device for a drive device, which is designed to control a drive device 1. It should be noted herein that the drive device 1 according to the present embodiment is a vehicular drive device (a drive device for a hybrid vehicle) for driving a vehicle (a hybrid vehicle) 6 equipped with both an internal combustion engine 11 and a rotating electrical machine 12 as driving force sources. The control device 3 according to the present embodiment will be described hereinafter in detail.

1. Structure of Drive Device

Figure 1:
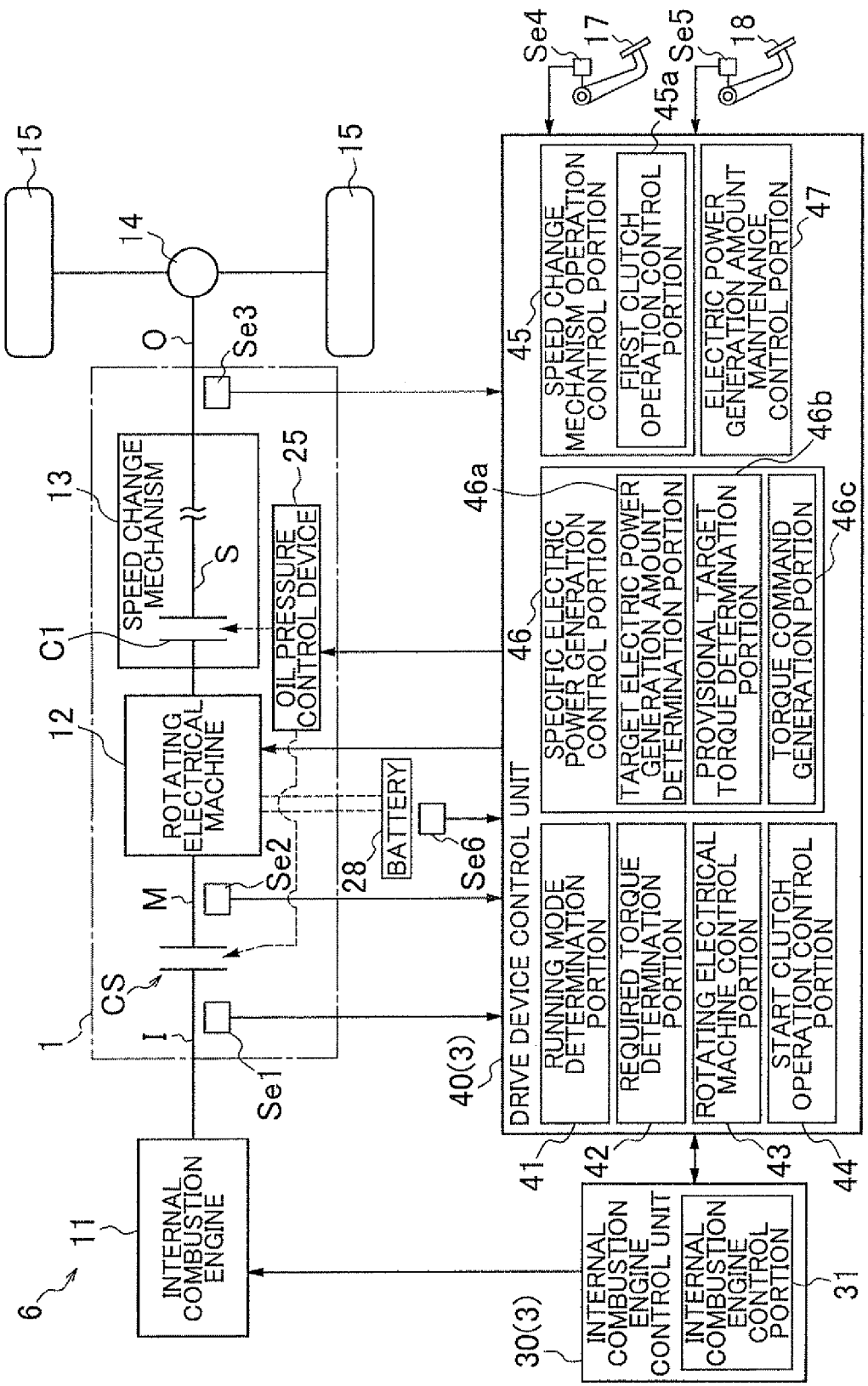
FIG. 1 is a schematic view showing overall structures of a vehicular drive device and a control device for the vehicular drive device according to an embodiment of the present invention.

First of all, the structure of the drive device 1, which is to be controlled by the control device 3 according to the present embodiment, will be described. The drive device 1 according to the present embodiment is structured as a drive device for a hybrid vehicle of a so-called one motor parallel type. As shown in FIG. 1, this drive device 1 has the rotating electrical machine 12 provided in a drive train path connecting an input shaft I drivingly coupled to the internal combustion engine 11 with an output shaft O drivingly coupled to wheels 15, has a start clutch CS provided between the input shaft I and the rotating electrical machine 12, and has a speed change mechanism 13 provided between the rotating electrical machine 12 and the output shaft O. These components are arranged on the same axis. It should be noted that the speed change mechanism 13 is provided with a first clutch C1 for shifting as will be described later, and that the first clutch C1 is thus provided between the rotating electrical machine 12 and the output shaft O in the drive train path. The respective structures of these components are accommodated in a drive device case (not shown). In the present embodiment, the input shaft I may correspond to "the input member" in the present invention, and the output shaft O may correspond to "the output member" in the present invention.

The internal combustion engine 11 is a motor that is driven through the combustion of fuel inside the engine to extract a power. For example, various types of known engines such as gasoline engines, diesel engines, and the like may be employed as the internal combustion engine 11. The internal combustion engine 11 is so drivingly coupled to the input shaft I as to rotate together therewith. In this example, an output shaft such as a crankshaft or the like of the internal combustion engine 11 is drivingly coupled to the input shaft I. It should be noted that the internal combustion engine 11 may be drivingly coupled to the input shaft I via another device such as a damper or the like. The internal combustion engine 11 is drivingly coupled to the rotating electrical machine 12 via the start clutch CS.

The start clutch CS is provided between the internal combustion engine 11 and the rotating electrical machine 12. The start clutch CS is a friction engagement device that drivingly couples the input shaft I and an intermediate shaft M to each other selectively. In the present embodiment, the start clutch CS is structured as a wet multi-disc clutch. Further, in the present embodiment, the start clutch CS is arranged, in an oil tight state, in a clutch housing surrounding the periphery thereof, and is basically constantly immersed in oil in the clutch housing. In the present embodiment, the performance for cooling the start clutch CS can be held appropriate because an entirety thereof is constantly immersed in oil. In the present embodiment, the start clutch CS may correspond to "the first engagement device" in the present invention.

The rotating electrical machine 12 is structured to have a rotor (not shown) and a stator (not shown), and can perform a function as a motor (an electric motor) that is supplied with an electric power to generate a power and a function as a generator (an electric power generator) that is supplied with a power to generate an electric power. The rotor of the rotating electrical machine 12 is so drivingly coupled to the intermediate shaft M as to rotate together therewith. Further, the rotating electrical machine 12 is electrically connected to a battery 28 as a storage device via an inverter device (not shown). It should be noted that a capacitor or the like may be used as the storage device. The rotating electrical machine 12 is supplied with an electric power from the battery 28 to perform power running, or supplies the battery 28 with an electric power generated using a torque output by the internal combustion engine 11 or an inertial force of the vehicle 6 to store the electric power into the battery 28. Further, the intermediate shaft M, which rotates together with the rotor of the rotating electrical machine 12, is drivingly coupled to the speed change mechanism 13. That is, the intermediate shaft M serves as an input shaft (a shift input shaft) of the speed change mechanism 13.

In the present embodiment, the speed change mechanism 13 is an automatic stepped speed change mechanism having a plurality of shift speeds different in speed ratio from one another such that a changeover among the shift speeds can be made. In order to form the plurality of these shift speeds, the speed change mechanism 13 is equipped with one, or two or more gear mechanisms such as planetary gear mechanisms or the Eke, and a plurality of friction engagement devices such as clutches, brakes and the like for engaging or disengaging rotary elements of this or these gear mechanisms to make a changeover among the shift speeds. In this case, the speed change mechanism 13 is equipped with the first clutch C1 as one of the plurality of the friction engagement devices for shifting. In the present embodiment, the first clutch C1 is structured as a wet multi-disc clutch. The first clutch C1 is so provided as to drivingly couple the intermediate M and a shift intermediate shaft S provided in the speed change mechanism 13 to each other selectively. In the present embodiment, the first clutch C1 may correspond to "the second engagement device" in the present invention. The shift intermediate shaft S is drivingly coupled to the output shaft O via a shaft member or another friction engagement device in the speed change mechanism 13.

The speed change mechanism 13 changes the rotational speed of the intermediate shaft M at a predetermined speed ratio set for each of the shift speeds formed in accordance with engagement states of the plurality of the friction engagement devices, converts a torque, and transmits the converted torque to the output shaft O. The torque transmitted from the speed change mechanism 13 to the output shaft O is distributed and transmitted to the two wheels 15, namely, the right wheel 15 and the left wheel 15 via an output differential gear mechanism 14. Thus, the drive device 1 can cause the vehicle 6 to run by transmitting one or both of a torque of the internal combustion engine 11 and a torque of the rotating electrical machine 12 to the wheels 15.

Further, in the present embodiment, the drive device 1 is equipped with an oil pump (not shown) drivingly coupled to the intermediate shaft M. The oil pump functions as an oil pressure source for suctioning oil accumulated in an oil pan (not shown) to supply the oil to respective portions of the drive device 1. The oil pump operates by being driven by one or both of a driving force of the rotating electrical machine 12 and a driving force of the internal combustion engine II, which are transmitted via the intermediate shaft M, and discharges the oil to generate an oil pressure. The pressure oil from the oil pump is adjusted to a predetermined oil pressure by an oil pressure control device 25, and then supplied to the start clutch CS, the first clutch C1 provided in the speed change mechanism 13, and the like. It should be noted that a structure equipped with an electric oil pump separately from this oil pump may also be adopted.

Further, as shown in FIG. 1, the vehicle 6 including this drive device 1 is equipped, at respective portions thereof, with a plurality of sensors, more specifically, an input shaft rotational speed sensor Se1, an intermediate shaft rotational speed sensor Se2, an output shaft rotational speed sensor Se3, an accelerator operation amount detection sensor Se4, a brake operation amount detection sensor Se5, and a battery state detection sensor Se6.

The input shaft rotational speed sensor Se1 is a sensor that detects a rotational speed of the input shaft I. The rotational speed of the input shaft I detected by the input shaft rotational speed sensor Se1 is equal to a rotational speed of the internal combustion engine 11. The intermediate shaft rotational speed sensor Se2 is a sensor that detects a rotational speed of the intermediate shaft M. The rotational speed of the intermediate shaft M detected by the intermediate shaft rotational speed sensor Se2 is equal to the rotational speed of the rotating electrical machine 12. The output shaft rotational speed sensor Se3 is a sensor that detects a rotational speed of the output shaft O. The control device 3 can also derive a vehicle speed as a running speed of the vehicle 6 on the basis of the rotational speed of the output shaft O detected by the output shaft rotational speed sensor Se3.

The accelerator operation amount detection sensor Se4 is a sensor that detects an operation amount of an accelerator pedal 17 to detect an accelerator operation amount. The brake operation amount detection sensor Se5 is a sensor that detects an operation amount of a brake pedal 18, namely, a brake operation amount. In this example, the brake operation amount detection sensor Se5 detects a brake operation amount as an amount of change in stroke position of the brake pedal 18 as an example. The battery state detection sensor Se6 is a sensor that detects a state of the battery 28. The battery state detection sensor Se6 is structured by, for example, a voltage sensor, a current sensor, or the like, and detects a state of charge (an SOC) as a state of the battery 28 in this example. The control device 3 can also derive a storage amount of the battery 28 on the basis of the SOC detected by the battery state detection sensor Se6. Pieces of information indicating detection results obtained by these respective sensors Se1 to Se6 are output to the control device 3, which will be described next.

2. Structure of Control Device

Next, the structure of the control device 3 according to the present embodiment will be described. As shown in FIG. 1, the control device 3 according to the present embodiment is equipped with an internal combustion engine control unit 30 for mainly controlling the internal combustion engine 11, and a drive device control unit 40 for mainly controlling the rotating electrical machine 12, the start clutch CS, and the speed change mechanism 13. The internal combustion engine control unit 30 and the drive device control unit 40 fulfill a function as a core member that performs the operation control of the respective portions of the drive device 1.

Each of this internal combustion engine control unit 30 and this drive device control unit 40 is equipped with a calculation processing device such as a CPU or the like as a core member thereof, and is structured to have a storage device or the like, such as a RAM, a ROM or the like (not shown). In addition, respective functional portions of the internal combustion engine control unit 30 and the drive device control unit 40 are structured by a piece of software (a program) stored in the ROM or the like, a piece of hardware such as a separately provided calculation circuit or the like, or both of them. These respective functional portions are structured such that pieces of information can be exchanged among them. Furthermore, the internal combustion engine control unit 30 and the drive device control unit 40 are also structured such that pieces of information can be exchanged therebetween. Further, the internal combustion engine control unit 30 and the drive device control unit 40 are structured so as to be able to acquire pieces of information on detection results obtained by the aforementioned respective sensors Se1 to Se6.

The internal combustion engine control unit 30 is equipped with an internal combustion engine control portion 31.

The internal combustion engine control portion 31 is a functional portion that performs the operation control of the internal combustion engine 11. The internal combustion engine control portion 31 determines a target torque and a target rotational speed as control targets of an output torque of the internal combustion engine 11 (an internal combustion engine torque Te) and a rotational speed of the internal combustion engine 11, and operates the internal combustion engine 11 in accordance with these control targets to perform the operation control of the internal combustion engine 11. In the present embodiment, the internal combustion engine control portion 31 can make a changeover between torque control of the internal combustion engine 11 and rotational speed control of the internal combustion engine 11 in accordance with the running state of the vehicle 6. It should be noted herein that the torque control is designed to issue a command of a target torque to the internal combustion engine 11 and cause the internal combustion engine torque Te to follow the target torque. Further, the rotational speed control is designed to issue a command of a target rotational speed to the internal combustion engine 11 and determine a target torque such that the rotational speed of the internal combustion engine 11 follows the target rotational speed.

For example, the internal combustion engine control portion 31 determines an internal combustion engine required torque, namely, part of a vehicle required torque Td determined by a later-described required torque determination portion 42, which is borne by the internal combustion engine 11, during the normal running of the vehicle 6 (during the running in a later-described assist running mode; the same will hold true hereinafter). The internal combustion engine control portion 31 then performs torque control using the internal combustion engine required torque thus determined as the aforementioned target torque. Further, in the present embodiment, the internal combustion engine control portion 31 can receive an internal combustion engine torque command Ce generated by a later-described torque command generation portion 46c, and perform the torque control using a torque corresponding to the internal combustion engine torque command Ce thus received as the aforementioned target torque.

The drive device control unit 40 is equipped with a running mode determination portion 41, a required torque determination portion 42, a rotating electrical machine control portion 43, a start clutch operation control portion 44, a speed change mechanism operation control portion 45, a specific electric power generation control portion 46, and an electric power generation amount maintenance control portion 47.

The running mode determination portion 41 is a functional portion that determines a running mode of the vehicle 6. The running mode determination portion 41 determines a running mode to be realized by the drive device 1 on the basis of, for example, a vehicle speed derived on the basis of a detection result obtained by the output shaft rotational speed sensor Se3, an accelerator operation amount detected by the accelerator operation amount detection sensor Se4, and a storage amount of the battery 28 derived on the basis of a detection result obtained by the battery state detection sensor Se6, and the like. In this case, the running mode determination portion 41 refers to a mode selection map (not shown) that is made available by being stored in a recording device such as a memory or the like and defines a relationship among the vehicle speed, the accelerator operation amount, the storage amount, and the running mode.

In this example, an electric running mode, a parallel running mode, and a stop electric power generation mode are included in the running modes that can be determined by the running mode determination portion 41. In the electric running mode, the start clutch CS is rendered in a disengagement state to cause the vehicle 6 to run only by an output torque of the rotating electrical machine 12 (a rotating electrical machine torque Tm). In the parallel running mode, the start clutch CS is rendered in an engagement state (including a complete engagement state and a slip engagement state) to cause the vehicle 6 to run at least by the internal combustion engine torque Te. In this case, according to need, the rotating electrical machine 12 outputs the rotating electrical machine torque Tm as a positive value (>0) to supplement a driving force resulting from the internal combustion engine torque Te, or outputs the rotating electrical machine torque Tm as a negative value (<0) to carry out electric power generation using part of the internal combustion engine torque Te. That is, in this example, an assist running mode in which the rotating electrical machine 12 supplements a driving force and an electric power generation running mode in which the rotating electrical machine 12 carries out electric power generation are included in the parallel running mode. In the stop electric power generation mode, the start clutch CS is rendered in the complete engagement state and the first clutch C1 is rendered in the disengagement state, so that the rotating electrical machine 12 carries out electric power generation by the internal combustion engine torque Te when the vehicle 6 is at a standstill. It should be noted that the modes described herein are exemplary, and that a structure having various modes other than those modes can also be adopted.

The required torque determination portion 42 is a functional portion that determines the vehicle required torque Td needed to cause the vehicle 6 to run. The required torque determination portion 42 determines the vehicle required torque Td by, for example, referring to a predetermined map (not shown), on the basis of a vehicle speed derived on the basis of a detection result obtained by the output shaft rotational speed sensor Se3 and an accelerator operation amount detected by the accelerator operation amount detection sensor Se4. In the present embodiment, the vehicle required torque Td may correspond to "the required torque" in the present invention. The vehicle required torque Td thus determined is output to the internal combustion engine control portion 31, the rotating electrical machine control portion 43, the specific electric power generation control portion 46, and the like.

The rotating electrical machine control portion 43 is a functional portion that controls the operation of the rotating electrical machine 12. The rotating electrical machine control portion 43 determines a target torque and a target rotational speed as control targets of the rotating electrical machine torque Tm and the rotational speed respectively, and operates the rotating electrical machine 12 in accordance with these control targets to control the operation of the rotating electrical machine 12. In the present embodiment, the rotating electrical machine control portion 43 can make a changeover between torque control of the rotating electrical machine 12 and rotational speed control of the rotating electrical machine 12 in accordance with the running state of the vehicle 6. It should be noted herein that the torque control is designed to issue a command of a target torque to the rotating electrical machine 12 so that the rotating electrical machine torque Tm follows the target torque. Further, the rotational speed control is designed to issue a command of a target rotational speed to the rotating electrical machine 12 and determine the target torque such that the rotational speed of the rotating electrical machine 12 follows the target rotational speed.

For example, during the normal running of the vehicle 6, the rotating electrical machine control portion 43 determines a rotating electrical machine required torque, namely, part of the vehicle required torque Td determined by the required torque determination portion 42, which is borne by the rotating electrical machine 12. The rotating electrical machine control portion 43 then controls the rotating electrical machine torque Tm using the rotating electrical machine required torque thus determined as the aforementioned target torque. Further, in the present embodiment, the rotating electrical machine control portion 43 can perform rotational speed control of the rotating electrical machine 12 using a preset later-described provisional target rotational speed Nm0 of the rotating electrical machine 12 as the aforementioned target rotational speed. Further, the rotating electrical machine control portion 43 can also change the aforementioned target rotational speed in accordance with a situation as will be described later, and perform the rotational speed control of the rotating electrical machine 12 on the basis of the changed target rotational speed.

The start clutch operation control portion 44 is a functional portion that controls the operation of the start clutch CS. It should be noted herein that the start clutch operation control portion 44 controls the oil pressure supplied to the start clutch CS via the oil pressure control device 25, and controls the engagement pressure of the start clutch CS to control the operation of the start clutch CS. For example, the start clutch operation control portion 44 outputs an oil pressure command value Pcs for the start clutch CS, and makes the oil pressure supplied to the start clutch CS via the oil pressure control device 25 equal to a disengagement pressure lower than a disengagement boundary pressure to render the start clutch CS in the disengagement state. Further, the start clutch operation control portion 44 makes the oil pressure supplied to the start clutch CS via the oil pressure control device 25 equal to a complete engagement pressure higher than an engagement boundary pressure to render the start clutch CS in the complete engagement state. Further, the start clutch operation control portion 44 makes the oil pressure supplied to the start clutch CS via the oil pressure control device 25 equal to a slip engagement pressure equal to or higher than the disengagement boundary pressure and equal to or lower than the engagement boundary pressure to render the start clutch CS in the slip engagement state. In the present embodiment, the start clutch operation control portion 44 may correspond to "the first engagement device operation control portion" in the present invention.

It should be noted herein that the term "disengagement state" means a state in which neither rotation nor a driving force is transmitted between one rotary member (the input shaft I in this case) of the start clutch CS and the other rotary member (the intermediate shaft M in this case) of the start clutch CS. The term "slip engagement state" means a state in which the one rotary member and the other rotary member are engaged with each other with a difference in rotational speed therebetween. The term "complete engagement state" means a state in which the one rotary member and the other rotary member are engaged with each other so as to rotate together with each other (a directly-coupled engagement state). Further, the term "engagement pressure" means a pressure at which the one rotary member and the other rotary member are pressed against each other. Further, the term "disengagement pressure" means a pressure at which the start clutch CS is constantly in the disengagement state. The term "disengagement boundary pressure" means a pressure (a disengagement-side slip boundary pressure) at which the start clutch CS is in a slip boundary state as a boundary between the disengagement state and the slip engagement state. The term "engagement boundary pressure" means a pressure (an engagement-side slip boundary pressure) at which the start clutch CS is in a slip boundary state as a boundary between the slip engagement state and the complete engagement state. The term "complete engagement pressure" means a pressure at which the start clutch CS is constantly in the complete engagement state regardless of fluctuations in the torque transmitted to the start clutch CS. The same will hold true hereinafter for the other engagement devices as well.

When the start clutch CS is in the slip engagement state, a driving force is transmitted between the input shaft I and the intermediate shaft M in a relatively rotating state. It should be noted that the magnitude of the torque that can be transmitted when the start clutch CS is in the complete engagement state or the slip engagement state is determined in accordance with the engagement pressure of the start clutch CS at that time. The magnitude of the torque at this time is referred to as "a transfer torque capacity Tcs" of the start clutch CS. In the present embodiment, the increases/decreases in the engagement pressure and the transfer torque capacity Tcs can be continuously controlled by continuously controlling the amount and pressure magnitude of the oil supplied to the start clutch CS in accordance with the oil pressure command value Pcs for the start clutch CS with the aid of a proportional solenoid or the like. It should be noted that the direction of transmission of the torque that is transmitted via the start clutch CS when the start clutch CS is in the slip engagement state is determined in accordance with the direction of relative rotation between the input shaft I and the intermediate shaft M.

Further, in the present embodiment, the start clutch operation control portion 44 can make a changeover between torque control of the start clutch CS and rotational speed control of the start clutch CS in accordance with the running state of the vehicle 6. It should be noted herein that the torque control is designed to make the transfer torque capacity Tcs of the start clutch CS equal to a predetermined target transfer torque capacity. Further, the rotational speed control is designed to determine the oil pressure command value Pcs for the start clutch CS or the target transfer torque capacity of the start clutch CS such that the differential rotational speed between the rotational speed of one rotary member (the input shaft I in this case) of the start clutch CS and the rotational speed of the other rotary member (the intermediate shaft M in this case) of the start clutch CS follows a predetermined target differential rotational speed.

The speed change mechanism operation control portion 45 is a functional portion that controls the operation of the speed change mechanism 13. The speed change mechanism operation control portion 45 determines a target shift speed on the basis of an accelerator operation amount and a vehicle speed, and performs control for causing the speed change mechanism 13 to form the determined target shift speed. In this case, the speed change mechanism operation control portion 45 refers to a shift map (not shown) that is made available by being stored in a recording device such as a memory or the like and defines a relationship among the vehicle speed, the accelerator operation amount, and the target shift speed. The shift map is a map in which a shift schedule based on the accelerator operation amount and the vehicle speed is set. The speed change mechanism operation control portion 45 controls the oil pressure supplied to a predetermined one of the friction engagement devices installed in the speed change mechanism 13 on the basis of the determined target shift speed, thereby forming the target shift speed.

As described above, the speed change mechanism 13 is equipped with the first clutch C1 for shifting. This first clutch C1 cooperates with a one-way clutch to form a first shift speed in, for example, the complete engagement state. This first clutch C1 is also included, as a matter of course, in the components to be controlled by the speed change mechanism operation control portion 45. It should be noted herein that the functional portion that controls the operation of the first clutch C1 is referred to especially as a first clutch operation control portion 45a. The first clutch operation control portion 45a controls the oil pressure supplied to the first clutch C1 via the oil pressure control device 25 and controls the engagement pressure of the first clutch C1, thereby controlling the operation of the first clutch C1. For example, the first clutch operation control portion 45a outputs an oil pressure command value PO for the first clutch C1, and makes the oil pressure supplied to the first clutch C1 via the oil pressure control device 25 equal to a disengagement pressure, thereby rendering the first clutch C1 in the disengagement state. Further, the first clutch operation control portion 45a makes the oil pressure supplied to the first clutch C1 via the oil pressure control device 25 equal to a complete engagement pressure, thereby rendering the first clutch C1 in the complete engagement state. Further, the first clutch operation control portion 45a makes the oil pressure supplied to the first clutch C1 via the oil pressure control device 25 equal to a slip engagement pressure, thereby rendering the first clutch C1 in the slip engagement state. In the present embodiment, the first clutch operation control portion 45a may correspond to "the second engagement device operation control portion" in the present invention.

When the first clutch C1 is in the slip engagement state, a driving force is transmitted between the intermediate shaft M and the shift intermediate shaft S in a relatively rotating state. It should be noted that the magnitude of the torque that can be transmitted when the first clutch C1 is in the complete engagement state or the slip engagement state is determined in accordance with the engagement pressure of the first clutch C1 at that time. The magnitude of the torque at this time is referred to as "a transfer torque capacity Tc1" of the first clutch C1. In the present embodiment, the amount of the oil supplied to the first clutch C1 and the magnitude of the oil pressure supplied to the first clutch C1 are continuously controlled in accordance with the oil pressure command value Pc1 for the first clutch C1 by a proportional solenoid or the like, so that the increases/decreases in the engagement pressure and the transfer torque capacity Tc1 can be continuously controlled. It should be noted that the direction of transmission of the torque that is transmitted via the first clutch C1 when the first clutch C1 is in the slip engagement state is determined in accordance with the direction of relative rotation between the intermediate shaft M and the shift intermediate shaft S.

Further, in the present embodiment, the first clutch operation control portion 45a can make a changeover between torque control of the first clutch C1 and rotational speed control of the first clutch C1 in accordance with the running state of the vehicle 6. It should be noted herein that the torque control is designed to make the transfer torque capacity Tc1 of the first clutch C1 equal to a predetermined target transfer torque capacity. Further, the rotational speed control is designed to determine the oil pressure command value Pc1 for the first clutch C1 or the target transfer torque capacity of the first clutch C1 such that the differential rotational speed between the rotational speed of one rotary member (the intermediate shaft M) of the first clutch C1 and the rotational speed of the other rotary member (the shift intermediate shaft 5) follows a predetermined target differential rotational speed.

The specific electric power generation control portion 46 is a functional portion that performs predetermined specific electric power generation control. It should be noted herein that the control for causing the rotating electrical machine 12 to carry out electric power generation when both the start clutch CS and the first clutch C1 are in the slip engagement state is referred to as "specific electric power generation control" in the present embodiment. In the specific electric power generation control according to the present embodiment, while part of the internal combustion engine torque Te is transmitted to the wheels 15 via the output shaft O, the other (the remaining) part of the internal combustion engine torque Te is used to cause the rotating electrical machine 12 to carry out electric power generation. The specific electric power generation control portion 46 is equipped with a target electric power generation amount determination portion 46a, a provisional target torque determination portion 46b, and a torque command generation portion 46c. The target electric power generation amount determination portion 46a is a functional portion that determines a target electric power generation amount G1 to be achieved by the rotating electrical machine 12. The provisional target torque determination portion 46b is a functional portion that determines a provisional target torque Tm0 to be output by the rotating electrical machine 12. The torque command generation portion 46c is a functional portion that generates an internal combustion engine torque command Ce as a command of a target torque Te1 for the internal combustion engine 11. In the present embodiment, the torque command generation portion 46c may correspond to "the internal combustion engine torque command generation portion" in the present invention. The specific electric power generation control portion 46 plays a key role, and the functional portions 46a to 46c installed in the specific electric power generation control portion 46, the internal combustion engine control portion 31, the rotating electrical machine control portion 43, the start clutch operation control portion 44, the first clutch operation control portion 45a, and the like cooperate with one another to perform the specific electric power generation control. The detailed contents of the specific electric power generation control will be described later.

The electric power generation amount maintenance control portion 47 is a functional portion that performs predetermined electric power generation amount maintenance control during the performance of the specific electric power generation control. It should be noted herein that the control for variably determining the target rotational speed of the rotating electrical machine 12 subjected to the rotational speed control during the performance of the specific electric power generation control to make an electric power generation amount G achieved by the rotating electrical machine 12 substantially constant within a predetermined range is referred to as "electric power generation amount maintenance control" in the present embodiment. The electric power generation amount maintenance control portion 47 plays a key role, and the rotating electrical machine control portion 43 and the like cooperate with one another to perform the electric power generation amount maintenance control. The detailed contents of the electric power generation amount maintenance control will be described later.

3. Contents of Electric Power Generation Amount Maintenance Control during Performance of Specific Electric Power Generation Control Next, the concrete contents of the specific electric power generation control and the electric power generation amount maintenance control according to the present embodiment will be described. In this case, the outline of the specific electric power generation control will be described first, and the electric power generation amount maintenance control performed in parallel with this specific electric power generation control during the performance thereof will be described thereafter. It should be noted that the vehicle required torque Td and the target electric power generation amount G1 are assumed to be held constant during the performance of the specific electric power generation control and the electric power generation amount maintenance control in the following description, to facilitate the understanding thereof.

3-1. Specific Electric Power Generation Control

Figure 2:
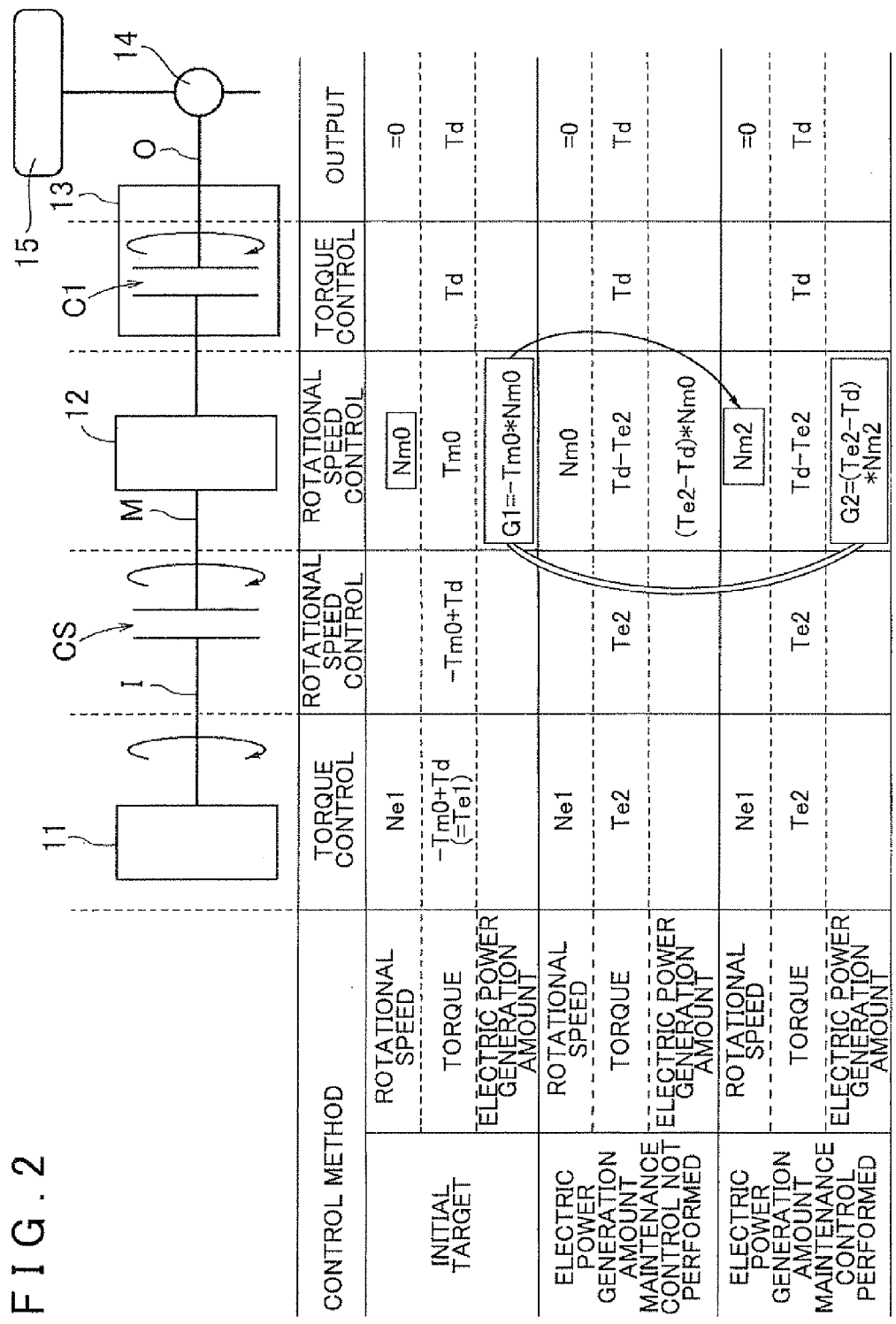
FIG. 2 is a schematic view for explaining basic concepts of specific electric power generation control and electric power generation amount maintenance control.

As shown in FIG. 2, which shows the basic concepts of the specific electric power generation control and the electric power generation amount maintenance control, the internal combustion engine 11, the rotating electrical machine 12, the start clutch CS, and the first clutch C1 are subjected to torque control, rotational speed control, rotational speed control, and torque control, respectively, during the specific electric power generation control in the present embodiment.

During the specific electric power generation control, the rotating electrical machine control portion 43 performs the rotational speed control for issuing a command of a target rotational speed Nm1 to the rotating electrical machine 12 to cause the rotational speed of the rotating electrical machine 12 to follow the target rotational speed Nm1 (this target rotational speed Nm1 is a concept including the later-described provisional target rotational speed Nm0 and a changed target rotational speed Nm2). It should be noted herein that the target rotational speed Nm1 is set at least within a range that is higher than the rotational speed of the shift intermediate shaft S and lower than the rotational speed of the input shaft I. Further, in the present embodiment, the target rotational speed Nm1 of the rotating electrical machine 12 during the specific electric power generation control is not maintained equal to a constant value, but can be changed in accordance with the prevailing situation on each occasion. This point will be described later. In this case, an initial value of the target rotational speed Nm1 of the rotating electrical machine 12 at the time of the start of the specific electric power generation control is referred to as the provisional target rotational speed Nm0. In the present embodiment, this provisional target rotational speed Nm0 is set to a value within such a rotational speed range that the rotating electrical machine 12 can continuously generate the electric power in the target electric power generation amount G1 without overheating.

It should be noted herein that the target electric power generation amount G1 is determined by the target electric power generation amount determination portion 46a on the basis of at least one of the storage amount of the battery 28 derived on the basis of the detection result obtained by the battery state detection sensor Se6 and the electric power consumption by electrically driven auxiliaries installed in the vehicle 6 (a compressor for an on-vehicle air-conditioner, an oil pump for power steering, a water pump for the coolant of the internal combustion engine 11, and the like). In this example, the target electric power generation amount G1 is determined on the basis of both the storage amount of the battery 28 and the electric power consumption by the auxiliaries such that the electric power consumption by the auxiliaries can be sufficiently compensated for and the storage amount of the battery 28 can be recovered when it tends to be insufficient. It should be noted that the vehicle 6 is not equipped with an alternator (an electric power generator) separate from the rotating electrical machine 12 in the present embodiment. That is, the drive device 1 according to the present embodiment is an alternator-less vehicular drive device.

In order to ensure the predetermined target electric power generation amount G1 (>0), the absolute value of the rotating electrical machine torque Tm (<0) needs be increased as the rotational speed of the rotating electrical machine 12 decreases. When the absolute value of the rotating electrical machine torque Tm (<0) is increased, the value of the current flowing through a stator coil of the rotating electrical machine 12 during electric power generation increases, and hence the heat generation amount of the stator coil of the rotating electrical machine 12 increases. Thus, in the case where the rotating electrical machine 12 continuously carries out electric power generation for a long time with the rotational speed of the rotating electrical machine 12 relatively low, the temperature of the rotating electrical machine 12 rises in time and may exceed a permissible upper-limit temperature.

Thus, in the present embodiment, the provisional target rotational speed Nm0 is set as a value within such a rotational speed range that the heat generation amount of the rotating electrical machine 12 per unit time becomes equal to or smaller than a predetermined value set in advance (this predetermined value is determined in accordance with the performance for cooling the rotating electrical machine 12). A predetermined relational expression is established among the rotating electrical machine torque Tm, the rotational speed of the rotating electrical machine 12, the energy efficiency (constant) of the rotating electrical machine 12, and the heat generation amount per unit time. Therefore, a lower limit permitted for the rotational speed of the rotating electrical machine 12 is determined by setting upper limits for the absolute value of the rotating electrical machine torque Tm (<0) and the heat generation amount per unit time. In this example, the provisional target rotational speed Nm0 is set as a rotational speed obtained by adding a predetermined margin to the thus-determined lower limit of the rotational speed of the rotating electrical machine 12. A value within a range of, for example, 500 to 800 (rpm) can be set as this provisional target rotational speed Nm0. When the specific electric power generation control is started, the rotating electrical machine control portion 43 issues a command of the provisional target rotational speed Nm0 set as described above to the rotating electrical machine 12, and performs the rotational speed control to cause the rotational speed of the rotating electrical machine 12 to follow the provisional target rotational speed Nm0.

The provisional target torque determination portion 46b determines the provisional target torque Tm0 of the rotating electrical machine 12 on the basis of the target electric power generation amount G1 determined by the target electric power generation amount determination portion 46a and the provisional target rotational speed Nm0 set in advance as described above. In this case, the provisional target torque determination portion 46b may also be structured to determine the provisional target torque Tm0 on the basis of the target electric power generation amount G1 and the provisional target rotational speed Nm0, by taking into account an electric power loss resulting from electric power generation and a torque loss in a drive system as well. In this example, the provisional target torque determination portion 46b determines the provisional target torque Tm0 (<0) by dividing the target electric power generation amount G1 (>0) by the provisional target rotational speed Nm0 and converting the sign of the quotient.

During the specific electric power generation control, the internal combustion engine control portion 31 performs the torque control for issuing a command of the target torque Te1 to the internal combustion engine 11 to cause the torque of the internal combustion engine torque Te to follow the target torque Te1. In the present embodiment, the internal combustion engine control portion 31 receives the internal combustion engine torque command Ce generated by the torque command generation portion 46c, and performs the torque control using the received internal combustion engine torque command Ce as the target torque Te1. It should be noted herein that the internal combustion engine torque command Ce is generated as a sum (an added total) of the vehicle required torque Td determined by the required torque determination portion 42 and the absolute value of the provisional target torque Tm0 determined by the provisional target torque determination portion 46b in the present embodiment. It should be noted herein that since the rotating electrical machine 12 carries out electric power generation and the provisional target torque Tm0 assumes a negative value (Tm0<0) during the specific electric power generation control, the internal combustion engine torque command Ce is generated as a sum of the vehicle required torque Td and the absolute value of the provisional target torque Tm0 (−Tm0 in this case). In consequence, during the specific electric power generation control, the internal combustion engine control portion 31 issues a command of the target torque Te1, which is equal to the sum of the vehicle required torque Td and the absolute value of the provisional target torque Tm0, to the internal combustion engine 11 to perform the torque control, and thus causes the internal combustion engine 11 to output the internal combustion engine torque Te (=Te1=−Tm0+Td), which is equal to the sum of the vehicle required torque Td and the absolute value of the provisional target torque Tm0.

During the specific electric power generation control, the start clutch operation control portion 44 performs the rotational speed control for causing the differential rotational speed between the rotational speed of one rotary member (the input shaft I in this case) of the start clutch CS and the rotational speed of the other rotary member (the intermediate shaft M in this case) of the start clutch CS to follow a predetermined target differential rotational speed. In the present embodiment, during the specific electric power generation control, the rotating electrical machine 12 is subjected to the rotational speed control, and the rotational speed of the intermediate shaft M is maintained at the target rotational speed Nm1. Therefore, when the start clutch operation control portion 44 performs the rotational speed control, the rotational speed of the input shaft I is thereby maintained at a predetermined rotational speed (a constant value in the present embodiment). It should be noted that when the target rotational speed Nm1 is changed, the aforementioned target differential rotational speed is also changed in accordance with the change, and the rotational speed of the input shaft I is maintained at the predetermined rotational speed (the constant value in the present embodiment). That is, during the specific electric power generation control, the start clutch operation control portion 44 controls the engagement pressure of the start clutch CS in such a manner as to make the rotational speed of the input shaft I equal to the predetermined rotational speed (the constant value in the present embodiment). In the present embodiment, the start clutch CS is subjected to the rotational speed control such that the rotational speed of the input shaft I is maintained at the constant value, and the entirety of the internal combustion engine torque Te is thereby transmitted to the intermediate shaft M, which is located on the rotating electrical machine 12 side, via the start clutch CS.

During the specific electric power generation control, the first clutch operation control portion 45a performs the torque control for making the transfer torque capacity Tc1 of the first clutch C1 equal to a predetermined target transfer torque capacity. In the present embodiment, the target value of the transfer torque capacity Tc1 is so set as to coincide with the vehicle required torque Td determined by the required torque determination portion 42. That is, during the specific electric power generation control, the first clutch operation control portion 45a controls the engagement pressure of the first clutch C1 in such a manner as to make the transfer torque capacity Tc1 of the first clutch C1 equal to a predetermined transfer torque capacity (a constant value in the present embodiment) corresponding to the vehicle required torque Td. In the present embodiment, the first clutch C1 is subjected to the torque control such that the transfer torque capacity Tc1 of the first clutch C1 becomes equal to the constant value corresponding to the vehicle required torque Td, and part of the internal combustion engine torque Te transmitted to the intermediate shaft M, which is equivalent in magnitude to the vehicle required torque Td, is thereby transmitted to the output shaft O, which is located on the wheel 15 sides, via the first clutch C1.

In the present embodiment, a control system as described above is structured. Therefore, the entirety of the internal combustion engine torque Te output in accordance with the target torque Te1 $(=-Tm0+Td)$ is transmitted to the intermediate shaft M via the start clutch CS. Out of this torque, the torque equal in magnitude to the transfer torque capacity Tc1 of the first clutch C1, which is so controlled as to coincide with the vehicle required torque Td, is transmitted to the output shaft O via the first clutch C1. A differential torque $\Delta T$ $(=Tc1-Te)$ as a difference between the internal combustion engine torque Te transmitted via the start clutch CS and the torque corresponding to the transfer torque capacity Tc1, which is transmitted via the first clutch C1, serves as a regenerative torque for causing the rotating electrical machine 12 to carry out electric power generation. It should be noted that the differential torque $\Delta T$, namely, the regenerative torque of the rotating electrical machine 12 coincides with the provisional target torque Tm0 determined by the provisional target torque determination portion 46b in an ideal state where the internal combustion engine torque Te completely coincides with the target torque Te1 and the transfer torque capacity Tc1 of the first clutch C1 completely coincides with the vehicle required torque Td.

Meanwhile, in real specific electric power generation control, even when the internal combustion engine 11 is subjected to the torque control, the internal combustion engine torque Te that completely coincides with the target torque Te1 cannot always be output. Thus, the torque transmitted to the intermediate shaft M via the start clutch CS does not always completely coincide with the target torque Te1 either. Or else, even when the first clutch C1 is subjected to the torque control, the transfer torque capacity Tc1 that completely coincides with the vehicle required torque Td cannot always be realized. Thus, the torque transmitted to the output shaft O via the first clutch C1 does not always completely coincide with the vehicle required torque Td either.

For example, when the actual internal combustion engine torque Te (an internal combustion engine actual torque Te2) is smaller than the target torque Te1, the absolute value of the differential torque $\Delta T$ $(=Td-Te2)$ is smaller than the absolute value of the provisional target torque Tm0, and an actual electric power generation amount G2 $(=(Te2-Td)*Nm0)$ achieved by the rotating electrical machine 12, which is subjected to the rotational speed control, is smaller than the target electric power generation amount G1. Further, for example, when the internal combustion engine actual torque Te2 is larger than the target torque Te1, the absolute value of the differential torque $\Delta T$ is larger than the absolute value of the provisional target torque Tm0, and the actual electric power generation amount G2 is larger than the target electric power generation amount G1.

Further, for example, even in the case where the internal combustion engine actual torque Te2 completely coincides with the target torque Te1, when the transfer torque capacity Tc1 is larger than the vehicle required torque Td, the absolute value of the differential torque $\Delta T$ $(=Tc1-Te1)$ is smaller than the absolute value of the provisional target torque Tm0, and the actual electric power generation amount G2 $(=(Te1-Tc1)*Nm0)$ achieved by the rotating electrical machine 12, which is subjected to the rotational speed control, is smaller than the target electric power generation amount G1. Further, for example, when the transfer torque capacity Tc1 is smaller than the vehicle required torque Td, the absolute value of the differential torque $\Delta T$ is larger than the absolute value of the provisional target torque Tm0, and the actual electric power generation amount G2 is larger than the target electric power generation amount G1.

When the actual electric power generation amount G2 becomes smaller than the target electric power generation amount G1, the electric power consumption by the auxiliaries installed in the vehicle 6 cannot be sufficiently compensated for, or the electric power of the battery 28 is consumed to reduce the storage amount with a view to compensating for this electric power consumption. Or else, an electric power exceeding a permitted dischargeable electric power range may be extracted from the battery 28, and deterioration in the performance of the battery 28 may be caused in that case. Further, when the actual electric power generation amount G2 becomes larger than the target electric power generation amount G1, an electric power exceeding a permitted chargeable electric power range may be supplied to the battery 28, and deterioration in the performance of the battery 28 may be caused in that case. Or else, if the storage amount of the battery 28 is equal to or larger than a certain amount, even when the rotating electrical machine 12 carries out electric power generation, the battery 28 cannot be charged any further, and the actual electric power generation amount G2 may be partially or entirely wasted.

Thus, with a view to solving this problem, according to the present embodiment, the electric power generation amount maintenance control is performed in parallel with the specific electric power generation control. The details of the electric power generation amount maintenance control will be described hereinafter mainly with reference to FIGS. 2 to 4.

3-2. Electric Power Generation Amount Maintenance Control

In the present embodiment, during the electric power generation amount maintenance control, the aforementioned specific electric power generation control is continuously performed, and the target rotational speed Nm1 in the rotational speed control of the rotating electrical machine 12 can be changed depending on the situation. In the present embodiment, the rotating electrical machine control portion 43 determines the target rotational speed Nm1 in accordance with the magnitude of the differential torque $\Delta T$ in such a manner as to maintain a state in which the actual electric power generation amount G2 achieved by the rotating electrical machine 12 coincides with the constant target electric power generation amount G1 determined by the target electric power generation amount determination portion 46a. In this example, during the performance of the electric power generation amount maintenance control, the electric power generation amount maintenance control portion 47 monitors the actual electric power generation amount G2 achieved by the rotating electrical machine 12. The electric power generation amount maintenance control portion 47 acquires pieces of information on the target torque Tm1 and target rotational speed Nm1 of the rotating electrical machine 12, which is subjected to the rotational speed control, and derives the actual electric power generation amount G2 as a value obtained by converting the sign of a product of the target torque Tm1 and the target rotational speed Nm1. It should be noted that the electric power generation amount maintenance control portion 47 may be structured, in that case, to derive the actual electric power generation amount G2 on the basis of the target rotational speed Nm1 and the target torque Tm1, taking into account an electric power loss resulting from electric power generation and a torque loss in the drive system as well.

Now, referring to FIG. 2, the target electric power generation amount G1 at the time of the start of the specific electric power generation control is expressed by $$G1=-Tm0*Nm0=(Te1-Td)*Nm0 \quad (1)$$

as indicated by "(a) INITIAL TARGET" in the upper stage. It should be noted herein that when the electric power generation amount maintenance control is assumed not to have been performed despite a deviation of the internal combustion engine actual torque Te2 from the target torque Te1, an actual electric power generation amount G2' is expressed by $$G2'=(Te2-Td)*Nm0 \quad (2)$$

as indicated by "(b) ELECTRIC POWER GENERATION AMOUNT MAINTENANCE CONTROL NOT PERFORMED" in the middle stage, and hence has a deviation from the target electric power generation amount G1.

On the other hand, when the electric power generation amount maintenance control is actually performed, the target rotational speed Nm1 is changed from the provisional target rotational speed Nm0 to a new target rotational speed Nm2, and the actual electric power generation amount G2 is expressed by $$G2=(Te2-Td)*Nm2 \quad (3)$$

as indicated by "(c) ELECTRIC POWER GENERATION AMOUNT MAINTENANCE CONTROL PERFORMED" in the lower stage. In this case, the actual electric power generation amount G2 is so controlled as to coincide with the target electric power generation amount G1, and the changed target rotational speed Nm2 is theoretically expressed by $$Nm2=\{(Te1-Td)/(Te2-Td)\}*Nm0 \quad (4)$$

on the basis of the expressions (1) and (3). To put it the other way around, when the target rotational speed Nm1 of the rotating electrical machine 12 is eventually so controlled as to become equal to the target rotational speed Nm2 that satisfies the expression (4), the actual electric power generation amount G2 should coincide with the target electric power generation amount G1.

In the present embodiment, the electric power generation amount maintenance control portion 47 derives a deviation of the actual electric power generation amount G2 from the target electric power generation amount G1, and outputs information on the deviation to the rotating electrical machine control portion 43. The rotating electrical machine control portion 43 then subjects the target rotational speed Nm1 of the rotating electrical machine 12 to feedback control on the basis of the acquired deviation in such a manner as to make the actual electric power generation amount G2 coincide with the constant target electric power generation amount G1. That is, the rotating electrical machine control portion 43 adds a predetermined value to the unchanged target rotational speed Nm1 or subtracts the predetermined value from the unchanged target rotational speed Nm1 in such a manner as to cancel the deviation of the actual electric power generation amount G2 from the target electric power generation amount G1. More specifically, when the actual electric power generation amount G2 is smaller than the target electric power generation amount G1, the predetermined value is added to the unchanged target rotational speed Nm1 to raise the target rotational speed Nm1 (see FIG. 3). On the other hand, when the actual electric power generation amount G2 is larger than the target electric power generation amount G1, the predetermined value is subtracted from the unchanged target rotational speed Nm1 to lower the target rotational speed Nm1 (see FIG. 4).

It should be noted that the predetermined value in these cases can be a variable value obtained by, for example, multiplying the aforementioned deviation by a proportional gain. It should be noted that the proportional gain in this case may be a fixed value or a variable value that changes depending on the situation. Further, a value obtained by further adding an integral term or a differential term to the proportional gain may be adopted as the aforementioned variable value. That is, in the present embodiment, various methods such as proportional control, proportional-plus-integral control, and proportional-plus-integral-plus-derivative control, and the like can be adopted in subjecting the target rotational speed Nm1 of the rotating electrical machine 12 to feedback control. It should be noted that the aforementioned predetermined value can also be a fixed value. In this manner, through the performance of feedback control of the target rotational speed Nm1, the actual electric power generation amount G2 is always maintained at the constant target electric power generation amount G1 during the performance of the electric power generation amount maintenance control, and the target rotational speed Nm1 of the rotating electrical machine 12 substantially converges at the target rotational speed Nm2 that satisfies the aforementioned expression (4) in this case.

According to the above-described specific electric power generation control, basically, the rotational speed of the internal combustion engine 11 can be maintained constant, and the vehicle required torque Td can be transmitted to the wheels 15 via the output shaft O. Further, while the vehicle required torque Td is fulfilled, the electric power in the target electric power generation amount G1 can be continuously generated without overheating the rotating electrical machine 12 for a long time. Furthermore, through the performance of the electric power generation amount maintenance control as well as the specific electric power generation control, even in the case where the magnitude of the torque transmitted via the start clutch CS or the magnitude of the torque transmitted via the first clutch C1 varies, the state in which the actual electric power generation amount G2 coincides with the target electric power generation amount G1 can be appropriately maintained by appropriately changing the target rotational speed Nm1 of the rotating electrical machine 12 in accordance with the difference between those magnitudes. In consequence, the electric power consumption by the auxiliaries installed in the vehicle 6 can be steadily compensated for sufficiently. Further, since almost no surplus electric power is generated in first place, deterioration in the performance of the battery 28 resulting from the surplus electric power or the wasteful use of energy for electric power generation can be effectively suppressed.

It should be noted that when there arises a deviation of the actual electric power generation amount G2 from the target electric power generation amount G1, the target torque Te1 of the internal combustion engine 11 or the oil pressure command value Pc1 for the first clutch C1 may be so corrected as to cancel the deviation. However, in the control system according to the present embodiment, the aforementioned deviation may arise as a result of the variation of one or both of the internal combustion engine actual torque Te2 and the transfer torque capacity Tc1 of the first clutch C1. It is therefore difficult to specify in advance which one of the target torque Te1 and the oil pressure command value Pc1 should be corrected. Furthermore, since the internal combustion engine torque Te is especially not very good in responsiveness, it takes a certain time until the deviation is eliminated. In this respect, according to the present embodiment, the target rotational speed Nm1 of the rotating electrical machine 12, which is a device that is excellent in responsiveness and actually carries out electric power generation, is directly corrected. Therefore, the actual electric power generation amount G2 can be reliably made to coincide with the target electric power generation amount G1 in a short time.

Further, during the specific electric power generation control, both the start clutch CS and the first clutch C1 are maintained in the slip engagement state. Therefore, under the condition that the rotational speed of the input shaft I and the rotational speed of the output shaft O remain unchanged, the differential rotational speed between the intermediate shaft M and the shift intermediate shaft 5, which are located on respective sides of the first clutch C1, can be made lower than that in the case where, for example, the start clutch CS is in the complete engagement state and only the first clutch C1 is in the slip engagement state. In consequence, the heat generation amount of the first clutch C1 can be reduced, and the durability of the first clutch C1 can be enhanced by restraining the first clutch C1 from overheating. It should be noted that since the start clutch CS is also in the slip engagement state in this case, the heat generation amount of the start clutch CS is larger than that in the case where the start clutch CS is in the complete engagement state. However, in the present embodiment, the start clutch CS is always entirely immersed in oil in the clutch housing, and the cooling performance is held considerably appropriate. Therefore, there is no problem in particular.

It should be noted that the specific electric power generation control and the electric power generation amount maintenance control are performed at least in a predetermined low-vehicle-speed charge requirement state in the present embodiment. It should be noted herein that the low-vehicle-speed charge requirement state is a state in which the storage amount of the battery 28 is equal to or smaller than a charge requirement criterial threshold A1 and the rotational speed of the output shaft O is equal to or lower than a low vehicle speed criterial threshold A2 determined on the basis of the provisional target rotational speed Nm0 of the rotating electrical machine 12. The charge requirement criterial threshold A1 is a value serving as a criterion for determining whether or not the battery 28 needs to be charged. On the assumption that the upper limit of a possible charge range is 100(%), a value of, for example, 25 to 50(%) or the like can be set as this charge requirement criterial threshold A1. Further, the low vehicle speed criterial threshold A2 is a value derived on the basis of the provisional target rotational speed Nm0 and the speed ratio of the first shift speed in the speed change mechanism 13. It should be noted that a structure of determining that the rotational speed of the shift intermediate shaft S is equal to or lower than the provisional target rotational speed Nm0 instead of determining that the rotational speed of the output shaft O is equal to or lower than the low vehicle speed criterial threshold A2 is also acceptable. In this case, the provisional target rotational speed Nm0 serves as a second low vehicle speed criterial threshold A2'.

In this low-vehicle-speed charge requirement state, the amount of the electric power that can be supplied from the battery 28 tends to be insufficient. Therefore, there is a strong demand that the rotating electrical machine 12 carry out electric power generation such that the electric power generation amount G becomes equal to or larger than a predetermined amount. Further, the difference between the rotational speed of the input shaft I and the rotational speed of the output shaft O is relatively large. Therefore, with a view to restraining the start clutch CS and the first clutch C1 from overheating, there is a strong demand that the rotating electrical machine 12 carry out electric power generation when both the clutches are in the slip engagement state. In consequence, the aforementioned demands can be appropriately satisfied by adopting a structure of performing the specific electric power generation control and the electric power generation amount maintenance control in the low-vehicle-speed charge requirement state.

Figure 5A:
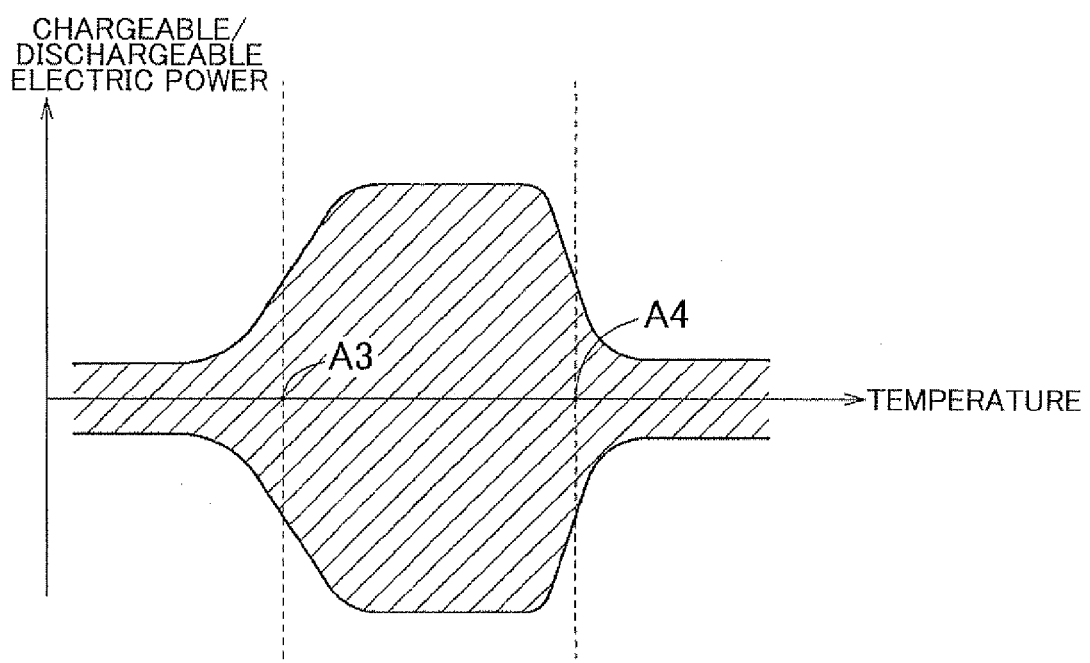
FIG. 5 is composed of schematic views showing a chargeable/dischargeable range of a storage device and an internal resistance of the storage device, respectively.
Figure 5B:
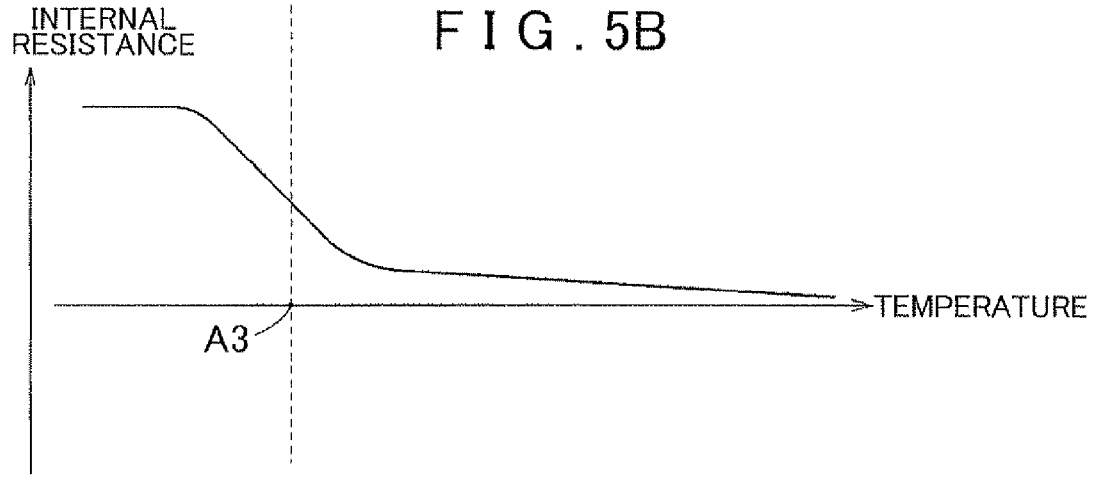

Further, in the present embodiment, the specific electric power generation control and the electric power generation amount maintenance control are performed at least in a predetermined low temperature state. It should be noted herein that the low temperature state is a state in which the temperature of the battery 28 is equal to or lower than a low temperature criterial threshold A3 set on the basis of an internal resistance of the battery 28. In general, as shown in FIG. 5B, the internal resistance of the battery 28 has the property of increasing as the temperature falls. Then, in a state where the temperature of the battery 28 is equal to or lower than a predetermined value, the internal resistance is higher than that at room temperatures. Since there is a limit to the voltage value permitted for the battery 28, the battery current is limited when the internal resistance has increased. As a result, as shown in FIG. 5A, the range of the magnitude of the instantaneously chargeable/dischargeable electric power permitted for the battery 28 is narrow. In this case, when the actual electric power generation amount G2 of the rotating electrical machine 12 becomes excessive with respect to the target electric power generation amount G1, the chargeable electric power tends to be exceeded as a result of the excess. If the chargeable electric power is exceeded due to the excess, the performance of the battery 28 may be deteriorated. Thus, there is a strong demand that the electric power generation amount G achieved by the rotating electrical machine 12 be held within a predetermined range in the low temperature state. In consequence, the aforementioned demands can be appropriately satisfied by adopting a structure of performing the specific electric power generation control and the electric power generation amount maintenance control in the low temperature state. It should be noted that, from this point of view, the low temperature criterial threshold A3 is preferably set to such a temperature that the internal resistance of the battery 28 clearly distinguishably increases in comparison with the internal resistance at room temperatures as shown in FIG. 5. A value of, for example, 0 to 15 (° C.) or the like can be set as this low temperature criterial threshold A3.

Figure 6A:
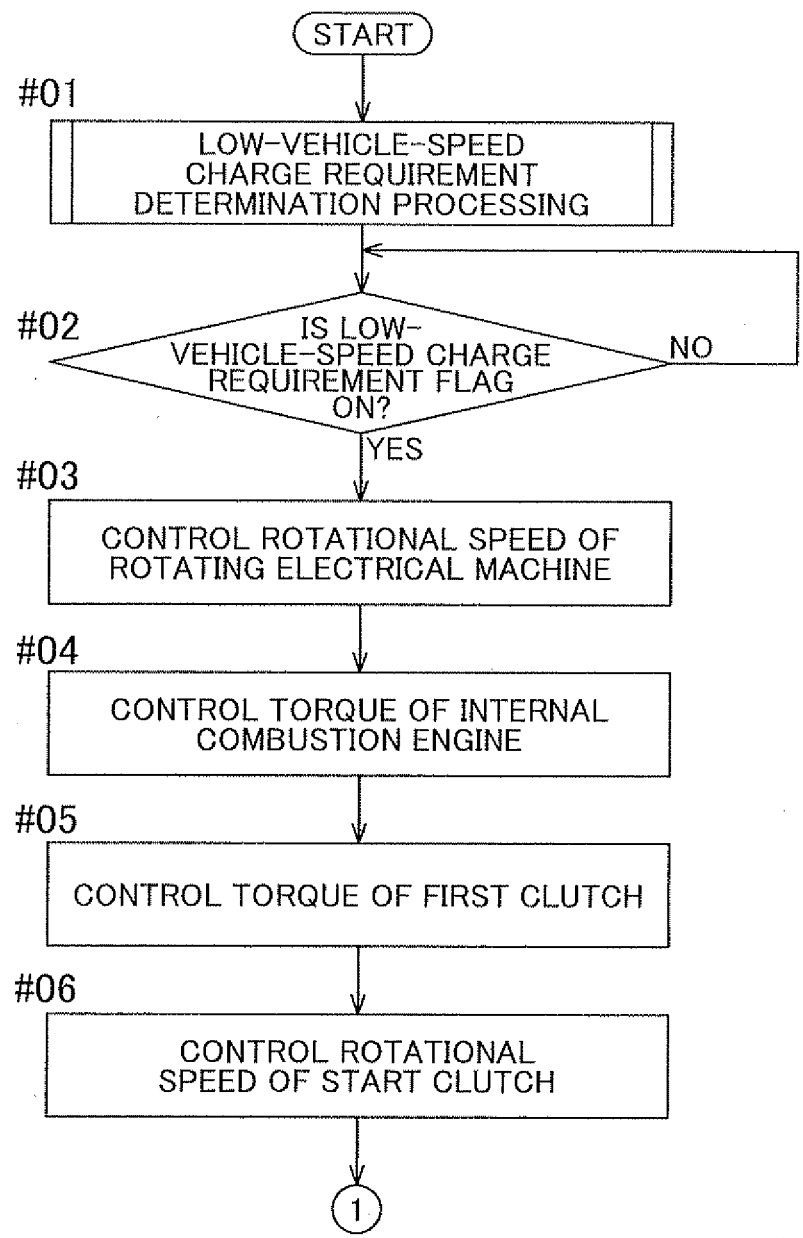
FIGS. 6A and 6B indicate a flowchart showing a processing procedure of a specific electric power generation processing and an electric power generation amount maintenance processing.
Figure 6B:
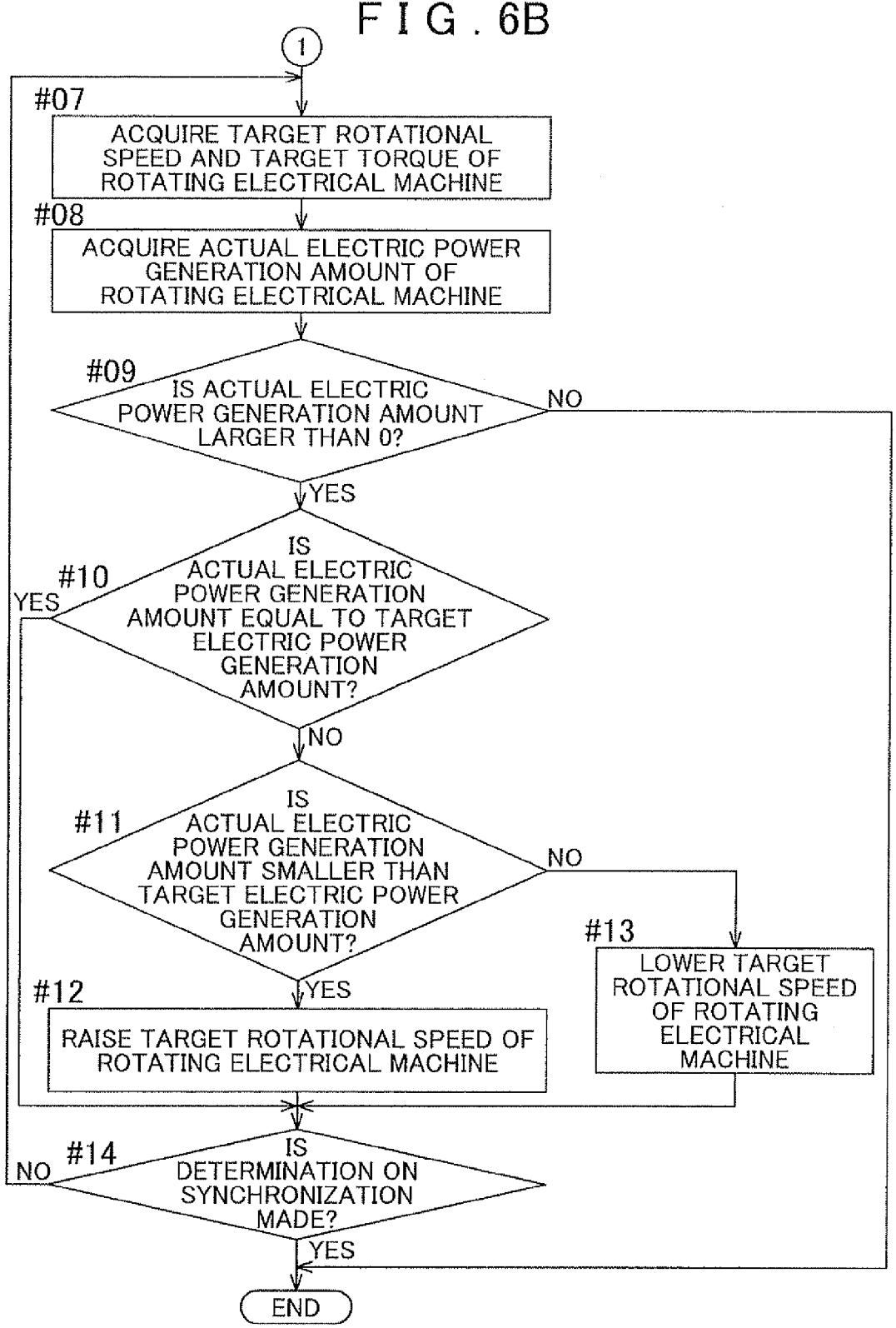
Figure 7A:
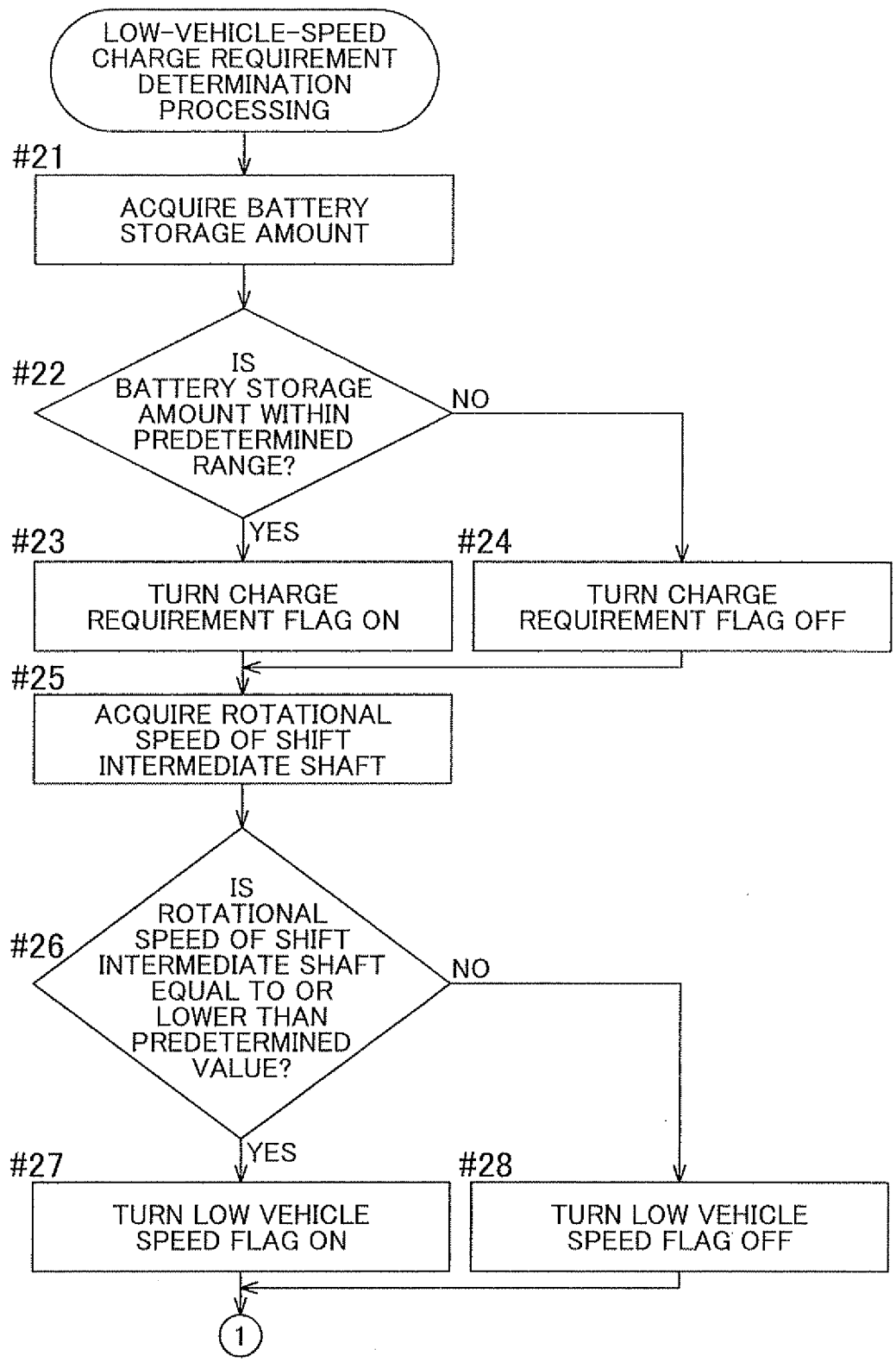
FIGS. 7A and 7B indicate a flowchart showing a processing procedure of a low-vehicle-speed charge requirement determination processing.
Figure 7B:
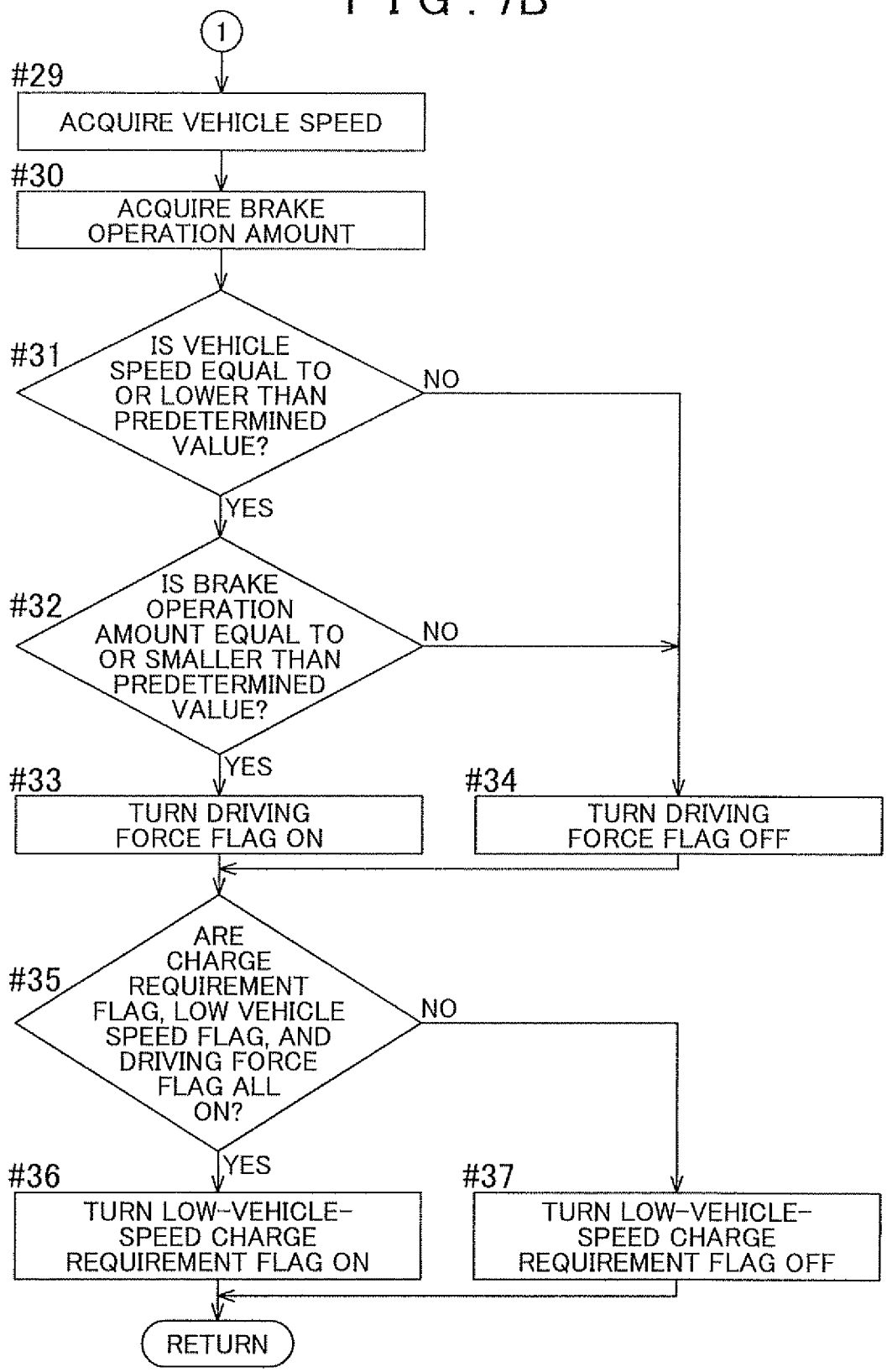

4. Processing Procedure of Specific Electric Power Generation Processing and Electric Power Generation Amount Maintenance Processing Next, a specific electric power generation processing and an electric power generation amount maintenance processing according to the present embodiment (hereinafter referred to simply as "the specific electric power generation processing") will be described with reference to flowcharts of FIGS. 6 and 7 and, when necessary, time charts of FIGS. 3 and 4. FIGS. 6A and 6B indicate a flowchart showing a processing procedure of the entire specific electric power generation processing, and FIGS. 7A and 7B indicate a flowchart showing a processing procedure of a low-vehicle-speed charge requirement determination processing in step #01 of FIG. 6A. The respective procedures of the specific electric power generation processing, which will be described hereinafter, are carried out by the respective functional portions of the control device 3. In the case where the respective functional portions are structured by programs, the calculation processing device installed in the control device 3 operates as a computer that executes the programs by which the aforementioned respective functional portions are structured.

Figure 3:
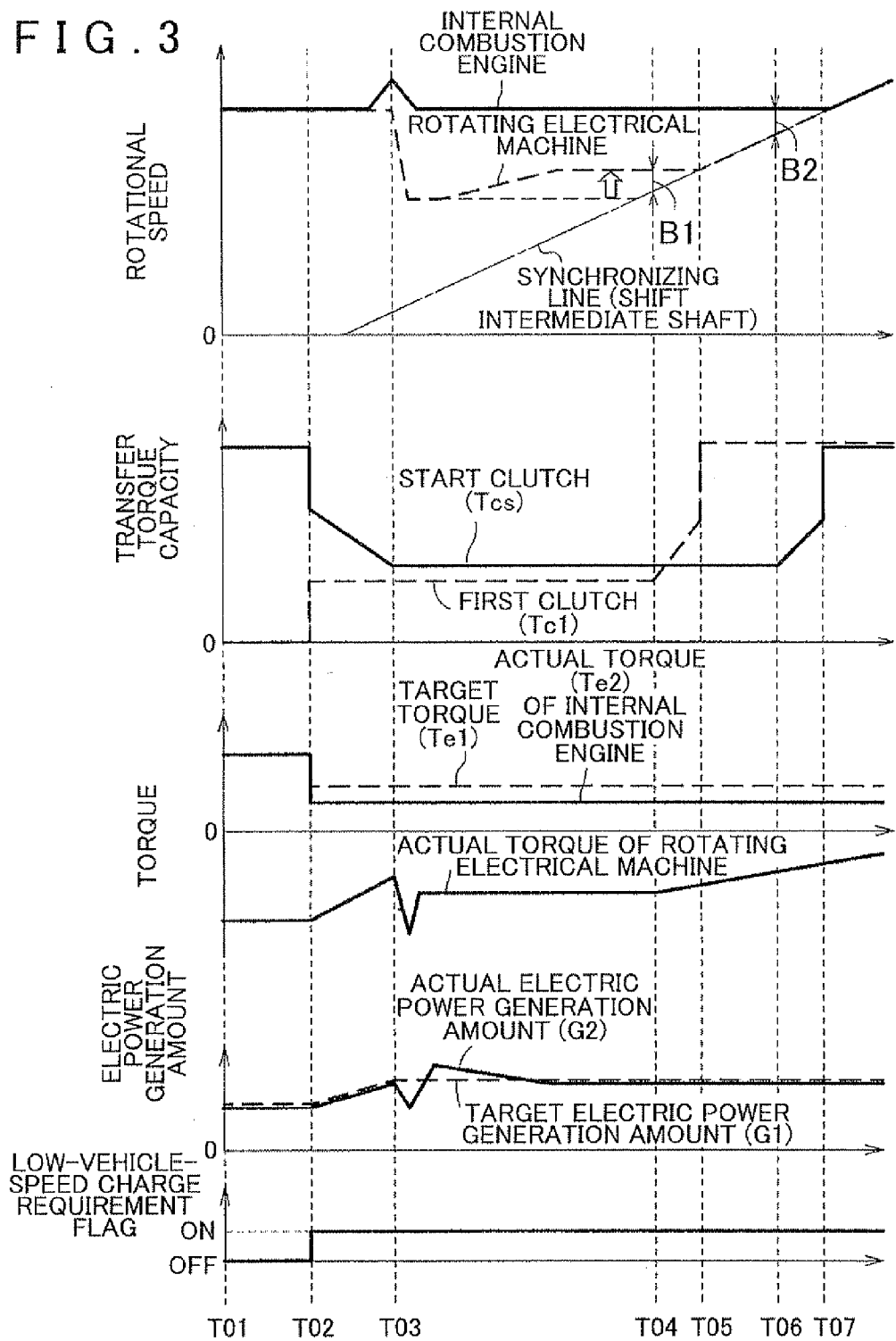
FIG. 3 is a time chart showing an example of operation states of respective portions when the specific electric power generation control and the electric power generation amount maintenance control are performed.
Figure 4:
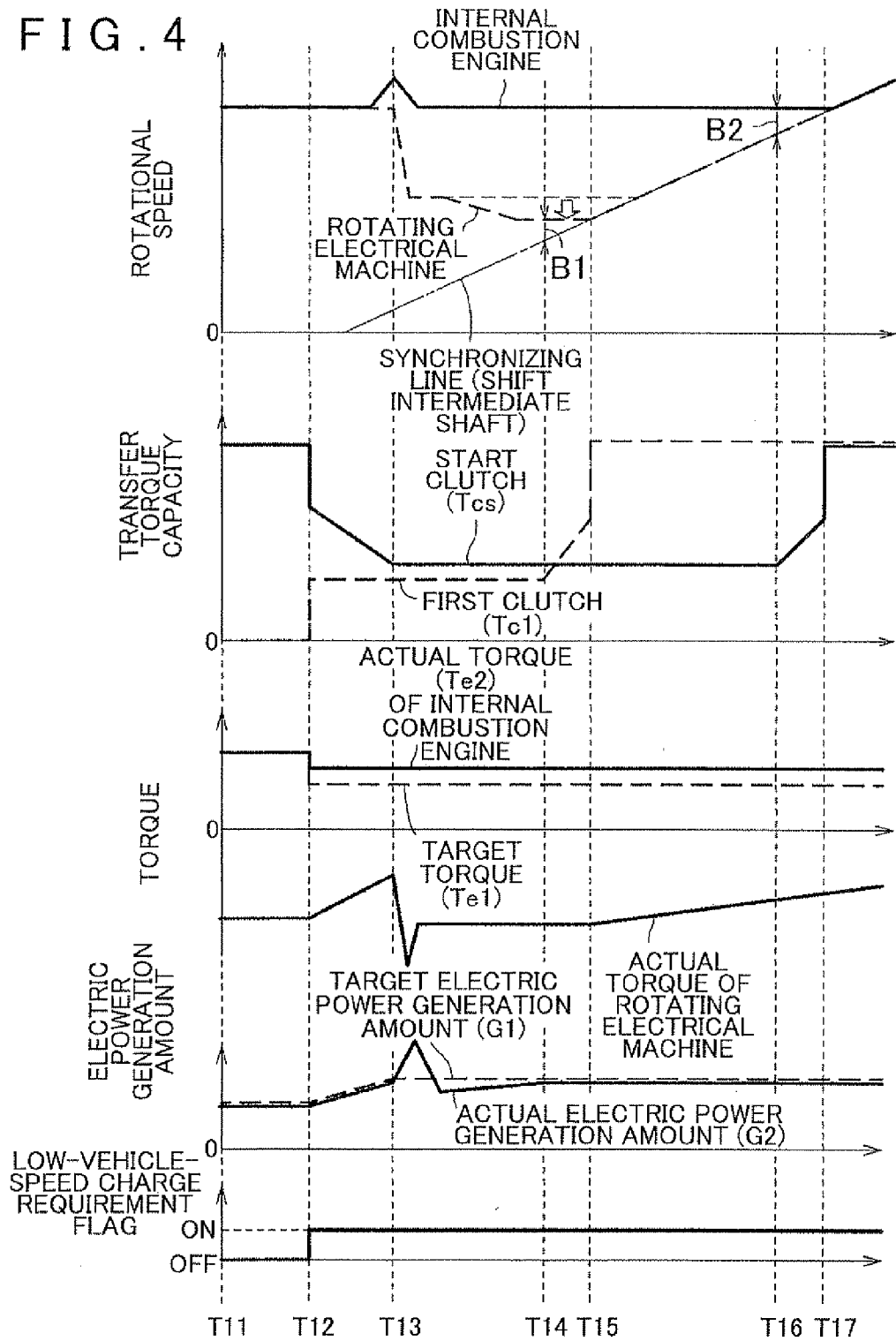
FIG. 4 is a time chart showing another example of operation states of the respective portions when the specific electric power generation control and the electric power generation amount maintenance control are performed.

In the present embodiment, as shown in FIG. 3, in a period between time T01 and time T02 at the beginning, a stop electric power generation mode is realized so that the rotating electrical machine 12 carries out electric power generation with the vehicle 6 stopped (between time T11 and time T12 in FIG. 4; the same will hold true hereinafter). In this state, as shown in FIG. 6A, the low-vehicle-speed charge requirement determination processing is performed first (step #01). The detailed processing procedure of this low-vehicle-speed charge requirement determination processing will be described later. Next, it is determined whether or not a low-vehicle-speed charge requirement flag is ON (step #02). When the low-vehicle-speed charge requirement flag is ON (step #02: Yes), the rotating electrical machine 12 is subjected to the rotational speed control (step #03) and the internal combustion engine 11 is subjected to the torque control (step #04) at and after time T02 (time T12). It should be noted that since the rotating electrical machine 12 is already subjected to the rotational speed control and the internal combustion engine 11 is already subjected to the torque control during the stop electric power generation mode in this example, no substantial processing is performed in these steps #03 and #04. Further, the first clutch C1 is subjected to the torque control (step #05) at and after time T02 (time T12), the transfer torque capacity of the start clutch CS is swept down between time T02 and time T03 (between time T12 and time T13), and the start clutch CS is subjected to the rotational speed control (step #06) at and after time T03 (time T13). In this state, a parallel running mode (an electric power generation running mode in this example) is realized.

During the specific electric power generation control, which is performed between time T03 and time T04 (between time T13 and time T14), the target electric power generation amount G1 is determined by the target electric power generation amount determination portion 46a as described above. The electric power generation amount maintenance control portion 47 acquires pieces of information on the target rotational speed Nm1 and target torque Tm1 of the rotating electrical machine 12, which is subjected to the rotational speed control (step #07), and derives and acquires the actual electric power generation amount G2 on the basis of these pieces of information (step #08). When the actual electric power generation amount G2 is equal to or smaller than zero, namely, when the rotating electrical machine 12 outputs a driving force without carrying out electric power generation (step #09: No), the specific electric power generation processing is immediately terminated. On the other hand, when the actual electric power generation amount G2 is larger than zero (step 409: Yes), the electric power generation amount maintenance control portion 47 determines whether or not the actual electric power generation amount G2 coincides with the target electric power generation amount G1 (step #10). When the actual electric power generation amount G2 does not coincide with the target electric power generation amount G1 and there is a deviation of the former from the latter (step 410: No), a determination on a relationship in magnitude between the actual electric power generation amount G2 and the target electric power generation amount G1 is made (step #11). When the actual electric power generation amount G2 is smaller than the target electric power generation amount G1 (step #11: Yes), the target rotational speed Nm1 of the rotating electrical machine 12 is raised (step #12) as shown in FIG. 3.

On the other hand, when the actual electric power generation amount G2 is larger than the target electric power generation amount G1 (step #11: No), the target rotational speed Nm1 of the rotating electrical machine 12 is lowered (step #13) as shown in FIG. 4. It should be noted that when it is determined in step #10 that the actual electric power generation amount G2 coincides with the target electric power generation amount G1 (step 410: Yes), the target rotational speed Nm1 of the rotating electrical machine 12 is maintained.

The processings of step #07 to step #13 are sequentially and repeatedly performed until the shift intermediate shaft S and the intermediate shaft M synchronize with each other as the vehicle speed rises. When the shift intermediate shaft S and the intermediate shaft M synchronize with each other in the course of time (step 414: Yes), the specific electric power generation processing is terminated.

It should be noted herein that the rotational speed of the shift intermediate shaft S is derived on the basis of the rotational speed of the output shaft O and the speed ratio of the shift speed formed in the speed change mechanism 13, and that it is determined that the intermediate shaft M and the shift intermediate shaft S synchronize with each other when the differential rotational speed between the rotational speed of the intermediate shaft M and the rotational speed of the shift intermediate shaft S is equal to or lower than a predetermined synchronization criterial threshold B1 at time T04 (time T14). In a period between time T04 and time T05 (between time T14 and time T15), the torque transfer capacity of the first clutch C1 is swept up, and the rotating electrical machine 12 is subjected to sweep control to make a changeover from rotational speed control to torque control. At and after time T05 (time T15), the rotating electrical machine 12 is subjected to the torque control, and the first clutch C1 is rendered in the complete engagement state. Further, when the differential rotational speed between the input shaft I and the intermediate shaft M becomes equal to or lower than a predetermined synchronization criterial threshold B2 in the course of time at time T06 (time T16), the torque transfer capacity of the start clutch CS is swept up in a period between time T06 and time T07 (between time T16 and time T17). At and after time T07 (time T17), the start clutch CS is rendered in the complete engagement state, and the vehicle 6 continues to run.

Next, the processing procedure of the low-vehicle-speed charge requirement determination processing in step #01 will be described. In the low-vehicle-speed charge requirement determination processing, a storage amount of the battery 28 is first acquired (step #21), and a determination on a charge requirement is made on the basis of whether or not the acquired storage amount of the battery 28 is within a predetermined range (step #22). In this example, it is determined whether or not the storage amount of the battery 28 is equal to or smaller than the charge requirement criterial threshold A1. When the storage amount of the battery 28 is equal to or smaller than the charge requirement criterial threshold A1 (step #22: Yes), a charge requirement flag is turned ON (step #23). When the storage amount of the battery 28 is larger than the charge requirement criterial threshold A1 (step #22: No), the charge requirement flag is turned OFF (step #24). It should be noted that a difference may be provided (a hysteresis may be provided) between a threshold in a descending phase of the storage amount and a threshold in an ascending phase of the storage amount when this determination on the charge requirement is made.

Next, the rotational speed of the shift intermediate shaft S at the time of the formation of the first shift speed is derived and acquired on the basis of the rotational speed of the output shaft O and the speed ratio of the first shift speed in the speed change mechanism 13 (step #25), and a determination on a low vehicle speed is made on the basis of whether or not the acquired rotational speed of the shift intermediate shaft S is equal to or lower than a predetermined value (step #26). In this example, it is determined whether or not the rotational speed of the shift intermediate shaft S is equal to or lower than a second low vehicle speed criterial threshold A2'. When the rotational speed of the shift intermediate shaft S is equal to or lower than the second low vehicle speed criterial threshold A2' (step #26: Yes), a low vehicle speed flag is turned ON (step #27). When the rotational speed of the shift intermediate shaft S is higher than the second low vehicle speed criterial threshold A2' (step #26: No), the low vehicle speed flag is turned OFF (step #28). It should be noted that a difference may be provided (a hysteresis may be provided) between a threshold in a descending phase of the rotational speed of the shift intermediate shaft S and a threshold in an ascending phase of the rotational speed of the shift intermediate shaft S when this determination on the low vehicle speed is made.

Next, a vehicle speed is derived and acquired on the basis of a rotational speed of the output shaft O (step #29), and a brake operation amount is acquired (step #30). A determination on a driving force is made on the basis of whether or not the acquired vehicle speed is equal to or lower than a predetermined value and the brake operation amount is equal to or smaller than a predetermined value (steps #31 and #32). In this example, it is determined whether or not the vehicle speed is equal to or lower than an extremely low speed criterial threshold A5 set to a value of, for example, 0 to 5 (km/h) or the like, and it is determined whether or not the brake operation amount is equal to or smaller than a brake criterial threshold A6 set to a value of for example, 25 to 50(%) or the like. It should be noted herein that the brake operation amount in a so-called full brake state is assumed to be 100(%) in this example. When the vehicle speed is equal to or lower than the extremely low speed criterial threshold A5 (step #31: Yes) and the brake operation amount is equal to or smaller than the brake criterial threshold A6 (step #32: Yes), a driving force flag is turned ON (step #33). On the other hand, when the vehicle speed is higher than the extremely low speed criterial threshold A5 (step #31: No) or the brake operation amount is larger than the brake criterial threshold A6 (step #32: No), the driving force flag is turned OFF (step #34). It should be noted that a difference may be provided (a hysteresis may be provided) between a threshold in a descending phase of the vehicle speed or the brake operation amount and a threshold in an ascending phase of the vehicle speed or the brake operation amount when this determination on the driving force is made.

It should be noted that although the determination on the charge requirement (steps #21 to #24), the determination on the low vehicle speed (steps #25 to #28), and the determination on the driving force (steps #29 to #34) have been described herein as being made in this order, the sequence of making these determinations can be set arbitrarily.

Next, it is determined whether or not the charge requirement flag as a determination result of the determination on the charge requirement, the low vehicle speed flag as a determination result of the determination on the low vehicle speed, and the driving force flag as a determination result of the determination on the driving force are all ON (step #35). When these flags are all ON (step #35: Yes), the low-vehicle-speed charge requirement flag is turned ON (step #36). When at least one of these flags is OFF (step #35: No), the low-vehicle-speed charge requirement flag is turned OFF (step #36). Then, the low-vehicle-speed charge requirement determination processing is terminated to make a return to the specific electric power generation processing.

5. Other Embodiments

Finally, other embodiments of the control device according to the present invention will be described. It should be noted that the structure disclosed in each of the following embodiments is not exclusively applied to that embodiment but can also be applied by being combined with the structures disclosed in the other embodiments unless there is a contradiction.

(1) In the foregoing embodiment, the case where the rotating electrical machine control portion 43 subjects the target rotational speed Nm1 of the rotating electrical machine 12 to feedback control on the basis of the deviation of the actual electric power generation amount G2 from the target electric power generation amount G1 has been described as an example. However, the embodiments of the present invention are not limited to this example. That is, the rotating electrical machine control portion 43 may directly determine the changed target rotational speed Nm2 in accordance with the magnitude of the differential torque ΔT and the target electric power generation amount G1 to thereby change the target rotational speed Nm1. In this case, the control device 3 is structured to have, in a recording device such as a memory or the like, a map (not shown) that defines a relationship among the magnitude of the differential torque ΔT, the target electric power generation amount G1, and the target rotational speed Nm1. Besides, the rotating electrical machine control portion 43 can be structured to estimate the magnitude of the differential torque ΔT from the value of the target torque in the rotational speed control, and determine, on the basis of the aforementioned map, the target rotational speed Nm1 corresponding to the estimated magnitude of the differential torque ΔT and the target electric power generation amount G1 determined by the target electric power generation amount determination portion 46a. Further, the rotating electrical machine control portion 43 may be structured to determine the target rotational speed Nm1 corresponding to the magnitude of the differential torque ΔT and the target electric power generation amount G1 on the basis of a predetermined relational expression that defines a relationship among the magnitude of the differential torque ΔT, the target electric power generation amount G1, and the target rotational speed Nm1 instead of using the aforementioned map. In these cases, the aforementioned map and the aforementioned relational expression may be created by taking into account an electric power loss resulting from electric power generation and a torque loss in the drive system.

(2) In the foregoing embodiment, the case where the provisional target rotational speed Nm0 is set to a value obtained by adding the predetermined margin to the lower limit of the rotational speed of the rotating electrical machine 12, which is determined on the basis of the upper limit of the heat generation amount per unit time or the like, has been described as an example. However, the embodiments of the present invention are not limited to this example. That is, the provisional target rotational speed Nm0 can be set to any value as long as this value is within such a rotational speed range that the rotating electrical machine 12 can be restrained from overheating. Or else, the provisional target rotational speed Nm0 may be set regardless of the upper limit of the heat generation amount per unit time or the like. In this case, the provisional target rotational speed Nm0 can be set to a value within such a rotational speed range that the first clutch C1 can be restrained from overheating, by taking into account, for example, the differential rotational speed between the intermediate shaft M and the shift intermediate shaft S, which are located on the respective sides of the first clutch C1 (the heat generation amount of the first clutch C1). In addition, the provisional target rotational speed Nm0 may be set by taking into account both the heat generation amount of the rotating electrical machine 12 and the heat generation amount of the first clutch C1.

(3) In the foregoing embodiment, the case where the electric power generation amount maintenance control portion 47 acquires the pieces of information on the target rotational speed Nm1 and target torque Tm1 of the rotating electrical machine 12, which is subjected to the rotational speed control, and derives the actual electric power generation amount G2 on the basis of these pieces of information has been described as an example. However, the embodiments of the present invention are not limited to this example. That is, for example, the electric power generation amount maintenance control portion 47 may be structured to be able to acquire pieces of information on a current value of a current flowing through electric power lines connecting the rotating electrical machine 12 and the battery 28 to each other and a voltage value between the power lines, and derive the actual electric power generation amount G2 on the basis of this current value and this voltage value.

(4) In the foregoing embodiment, the case where the specific electric power generation control and the electric power generation amount maintenance control are performed in the low-vehicle-speed charge requirement state on which the determination is made on the basis of both the storage amount of the battery 28 and the rotational speed of the output shaft O (or the shift intermediate shaft S) has been described as an example. However, the embodiments of the present invention are not limited to this example. That is, for example, the control device 3 may perform the specific electric power generation control and the electric power generation amount maintenance control regardless of the rotational speed of the output shaft O (or the shift intermediate shaft S) in the charge requirement state where the storage amount of the battery 28 is equal to or smaller than the charge requirement criterial threshold A1. Or else, for example, the control device 3 may perform the specific electric power generation control and the electric power generation amount maintenance control regardless of the storage amount of the battery 28 in the low vehicle speed state where the rotational speed of the output shaft O (or the shift intermediate shaft S) is equal to or lower than the low vehicle speed criterial threshold A2 (or the second low vehicle speed criterial threshold A2'). It should be noted that the control device 3 may be structured to perform the specific electric power generation control and the electric power generation amount maintenance control also in a state that is neither the charge requirement state nor the low vehicle speed state.

(5) In the foregoing embodiment, the case where the specific electric power generation control and the electric power generation amount maintenance control are performed in the low temperature state where the temperature of the battery 28 is equal to or lower than the low temperature criterial threshold A3 has been described as an example. However, the embodiments of the present invention are not limited to this example. As shown in FIG. 5A, the range of the magnitude of the instantaneously chargeable/dischargeable electric power permitted for the battery 28 is narrow in a high temperature state where the temperature of the battery 28 is equal to or higher than a predetermined high temperature criterial threshold A4 set to a value higher than the low temperature criterial threshold A3 as well as in the low temperature state. From this point of view, for example, the control device 3 may perform the specific electric power generation control and the electric power generation amount maintenance control in the aforementioned high temperature state. A value of, for example, 40 to 50 (° C.) or the like can be set as the high temperature criterial threshold A4 in this case. It should be noted that the control device 3 may be structured to perform the specific electric power generation control and the electric power generation amount maintenance control also in a state that is neither the low temperature state nor the high temperature state.

(6) In the foregoing embodiment, the case where the target electric power generation amount determination portion 46a determines the target electric power generation amount G1 on the basis of the storage amount of the battery 28 and the electric power consumption by the auxiliaries has been described as an example. However, the embodiments of the present invention are not limited to this example. In recent years, it is also common that an outlet of AC 100 V is provided inside the vehicle 6, and external components such as a personal computer, a portable audio system, and the like are often used in the vehicle. Thus, the target electric power generation amount determination portion 46a may determine the target electric power generation amount G1 also on the basis of the electric power consumption by an external component that is used by being supplied with an electric power from the outlet in the vehicle.

(7) In the foregoing embodiment, the case where the first clutch C1 for shifting as one of the plurality of the friction engagement devices installed in the speed change mechanism 13 is "the second engagement device" in the drive device 1 to be controlled by the control device 3 has been described as an example. However, the embodiments of the present invention are not limited to this example. That is, for example, a friction engagement device such as another one of the clutches, brakes and the like installed in the speed change mechanism 13 may be "the second engagement device".

(8) In the foregoing embodiment, the case where each of the start clutch CS as "the first engagement device" and the first clutch C1 as "the second engagement device", which are installed in the drive device 1 to be controlled by the control device 3, is a hydraulically driven engagement device whose engagement pressure is controlled in accordance with a supplied oil pressure has been described as an example. However, the embodiments of the present invention are not limited to this example. That is, for example, one or both of the start clutch CS and the first clutch C1 may be structured as an electromagnetic engagement device whose engagement pressure is controlled in accordance with a generated electromagnetic force.

Figure 8:
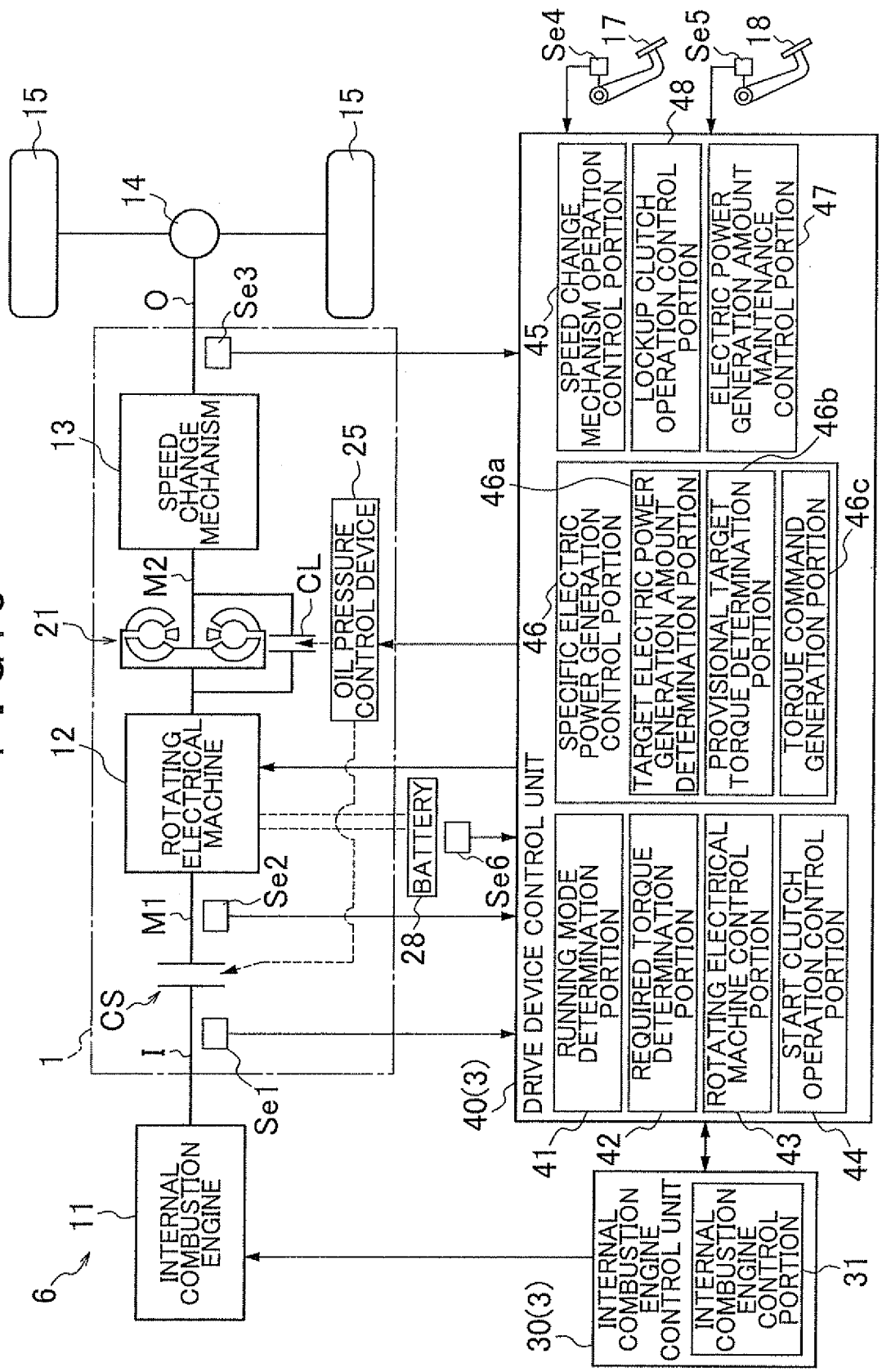
FIG. 8 is a schematic view showing overall structures of a vehicular drive device and a control device for the vehicular drive device according to another embodiment of the present invention.

(9) In the foregoing embodiment, the case where the first clutch C1 for shifting, which is installed in the speed change mechanism 13, is "the second engagement device" in the drive device 1 to be controlled by the control device 3 has been described as an example. However, the embodiments of the present invention are not limited to this example. That is, an engagement device other than the engagement device for shifting, which is installed in the speed change mechanism 13, can also be used as "the second engagement device" as long as that engagement device is provided between the rotating electrical machine 12 and the output shaft O in the drive train path connecting the input shaft I with the output shaft O. For example, as shown in FIG. 8, a lockup clutch CL belonging to a torque converter 21 may be "the second engagement device" in the case where a hydraulic transmission apparatus such as the torque converter 21 or the like is provided between the rotating electrical machine 12 and the speed change mechanism 13. In this case, the control device 3 is equipped with a lockup clutch operation control portion 48 that controls the operation of the lockup clutch CL as "a second engagement device operation control portion". The lockup clutch operation control portion 48 then controls the operation of the lockup clutch CL in the same manner as the first clutch operation control portion 45a controls the operation of the first clutch C1 in the foregoing embodiment, so that the various operations and effects described in the foregoing embodiment can be obtained.

(10) Or else, for example, as shown in FIG. 9, a transfer clutch CT provided between the rotating electrical machine 12 and the speed change mechanism 13 may be "the second engagement device". In this case, the control device 3 is equipped with a transfer clutch operation control portion 49 that controls the operation of the transfer clutch CT as "a second engagement device operation control portion". The transfer clutch operation control portion 49 then controls the operation of the transfer clutch CT in the same manner as the first clutch operation control portion 45a controls the operation of the first clutch C1 in the foregoing embodiment, so that the various operations and effects described in the foregoing embodiment can be obtained.

(11) It should be noted that in the structure where the lockup clutch CL or the transfer clutch CT is "the second engagement device" in the drive device 1 to be controlled by the control device 3, the speed change mechanism 13 can also be structured as, for example, an automatic continuously variable speed change mechanism of which the speed ratio can be changed in a stepless manner, a manual stepped speed change mechanism having a plurality of shift speeds with different speed ratios, which are manually switchable, a fixed speed change mechanism having only one shift speed with a fixed speed ratio (including "1"), or the like. Further, the speed change mechanism 13 may be set at any position as long as at least the start clutch CS, the rotating electrical machine 12, and the second engagement device are provided in this order in the drive train path connecting the input shaft I with the output shaft O.

Furthermore, the first clutch C1 for shifting, which is installed in the speed change mechanism 13, or the like may be used as "the second engagement device" instead of the lockup clutch CL or the transfer clutch CT to perform the specific electric power generation control and the electric power generation amount maintenance control according to the present embodiment even in the case where the drive device 1 to be controlled by the control device 3 is equipped with the lockup clutch CL or the transfer clutch CT.

(12) In the foregoing embodiment, the case where the control device 3 is equipped with the internal combustion engine control unit 30 for mainly controlling the internal combustion engine 11 and the drive device control unit 40 for mainly controlling the rotating electrical machine 12, the start clutch CS, and the speed change mechanism 13 has been described as an example. However, the embodiments of the present invention are not limited to this example. That is, the single control device 3 may control all the components including the internal combustion engine 11, the rotating electrical machine 12, the start clutch CS, the speed change mechanism 13, and the like. Or else, the control device 3 may be equipped with individual control units for controlling the internal combustion engine 11, the rotating electrical machine 12, and other various structures.

(13) In the foregoing embodiment, the case where the start clutch operation control portion 44 controls the engagement pressure of the start clutch CS in such a manner as to make the rotational speed of the input shaft I constant has been described as an example. However, the embodiments of the present invention are not limited to this example. That is, the start clutch operation control portion 44 may be structured to control the engagement pressure of the start clutch CS in such a manner as to make the rotational speed of the input shaft I equal to a predetermined rotational speed that changes over time. In this case, a value obtained by multiplying the acceleration of the rotational speed of the input shaft I (the internal combustion engine 11) by an inertial moment of a rotary member that rotates together with the input shaft I, such as the internal combustion engine 11 or the like, is an inertial torque, and a torque obtained by subtracting this inertial torque from the internal combustion engine torque Te is transmitted to the rotating electrical machine 12 side via the start clutch CS. In this case as well as the case of the foregoing embodiment, when the rate of change in the rotational speed of the input shaft I over time is low, the magnitude of the inertial torque is small, and the internal combustion engine torque Te is almost entirely transmitted to the rotating electrical machine 12 side via the start clutch CS. In consequence, as is the case with the foregoing embodiment, the actual electric power generation amount G2 can be made to coincide with the target electric power generation amount G1. On the other hand, even in the case where the rate of change in the rotational speed of the input shaft I over time is high, the actual electric power generation amount G2 can be made to coincide with the target electric power generation amount G1 since the rotating electrical machine control portion 43 is structured to determine the target rotational speed Nm1 in accordance with the magnitude of the differential torque between the torque transmitted via the start clutch CS and the torque transmitted via the first clutch C1.

(14) In the foregoing embodiment, the case where the vehicle required torque Td is maintained constant during the performance of the specific electric power generation control and the electric power generation amount maintenance control and the first clutch operation control portion 45a controls the engagement pressure of the first clutch C1 in such a manner as to make the transfer torque capacity Tc1 of the first clutch C1 equal to the constant value corresponding to the vehicle required torque Td has been described as an example. However, the embodiments of the present invention are not limited to this example. That is, the vehicle required torque Td may be changed over time during the performance of the specific electric power generation control and the electric power generation amount maintenance control and the first clutch operation control portion 45a may control the engagement pressure of the first clutch C1 in such a manner as to make the transfer torque capacity Tc1 of the first clutch C1 equal to a predetermined transfer torque capacity that changes over time in accordance with the vehicle required torque Td.

In this case as well, the target torque Te1 of the internal combustion engine 11 is determined in accordance with the vehicle required torque Td as in the above-mentioned expression (Te1−Tm0+Td). Thus, even when the transfer torque capacity Tc1 of the first clutch C1 changes over time, the differential torque between the torque transmitted via the start clutch CS and the torque transmitted via the first clutch C1 can be restrained from fluctuating, and the actual electric power generation amount G2 can be restrained from deviating from the target electric power generation amount G1.

Or else, the first clutch operation control portion 45a may also be structured to control the engagement pressure of the first clutch C1 in such a manner as to make the transfer torque capacity Tc1 of the first clutch C1 equal to a constant value or a value that changes over time, which is set regardless of the vehicle required torque Td. In this case, the target torque Te1 of the internal combustion engine 11 may be determined in accordance with the transfer torque capacity Tc1 as in the expression (Te1=−Tm0+Tc1).

(15) As regards other structures as well, the embodiments of the present invention disclosed in the present specification are exemplary in all respects, and the embodiments of the present invention are not limited thereto. That is, a structure obtained by appropriately modifying part of a structure that is not mentioned in the claims of the present application also belongs to the technical scope of the present invention as a matter of course as long as that structure is equipped with a structure mentioned in the claims and a structure equivalent thereto.

The present invention is suitably utilizable for a control device designed to control a vehicular drive device that has a rotating electrical machine provided in a drive train path connecting an input member drivingly coupled to an internal combustion engine with an output member drivingly coupled to wheels, has a first engagement device provided between the input member and the rotating electrical machine, and has a second engagement device provided between the rotating electrical machine and the output member.

What is claimed is:

1. A control device designed to control a vehicular drive device that has a rotating electrical machine provided in a drive train path connecting an input member drivingly coupled to an internal combustion engine with an output member drivingly coupled to wheels, has a first engagement device provided between the input member and the rotating electrical machine, and has a second engagement device provided between the rotating electrical machine and the output member, the control device being structured to be able to perform specific electric power generation control that causes the rotating electrical machine to carry out electric power generation when both the first engagement device and the second engagement device are in a slip engagement state, and the control device comprising:
a controller configured with a processor and internal storage, the controller capable of executing various functions to control aspects of the vehicular device, the controller programmed with functional portions comprising:
a first engagement device operation control portion controlling an engagement pressure of the first engagement device making a rotational speed of the input member equal to a predetermined rotational speed during the specific electric power generation control;
a second engagement device operation control portion controlling an engagement pressure of the second engagement device making a transfer torque capacity of the second engagement device equal to a predetermined transfer torque capacity during the specific electric power generation control; and
a rotating electrical machine control portion determining a target rotational speed maintaining a state in which an electric power generation amount achieved by the rotating electrical machine coincides with a predetermined target electric power generation amount, in accordance with a magnitude of a differential torque as a difference between a torque transmitted via the first engagement device and a torque transmitted via the second engagement device, in performing rotational speed control for causing a rotational speed of the rotating electrical machine to follow the target rotational speed by issuing a command of the target rotational speed to the rotating electrical machine during the specific electric power generation control.

2. The control device according to claim 1, further comprising: a provisional target torque determination portion determining a provisional target torque to be output by the rotating electrical machine on a basis of the target electric power generation amount and a preset provisional target rotational speed of the rotating electrical machine, and
an internal combustion engine torque command generation portion generating an internal combustion engine torque command as such a command as to make an output torque of the internal combustion engine coincide with a sum of a required torque needed to cause a vehicle to run and an absolute value of the provisional target torque during the specific electric power generation control.

3. The control device according to claim 2, wherein the provisional target rotational speed is set to a value within such a rotational speed range that a heat generation amount of the rotating electrical machine per unit time becomes equal to or smaller than a predetermined value set in advance.

4. The control device according to claim 1, wherein the rotating electrical machine control portion determines the target rotational speed through feedback control based on a deviation of an actual electric power generation amount achieved by the rotating electrical machine from the target electric power generation amount.

5. The control device according to claim 1, wherein the rotating electrical machine control portion determines the target rotational speed corresponding to the magnitude of the differential torque and the target electric power generation amount on a basis of a map or relational expression prescribing a relationship among the magnitude of the differential torque, the target electric power generation amount, and the target rotational speed.

6. The control device according to claim 1, wherein the specific electric power generation control is performed at least in a low-vehicle-speed charge requirement state in which a storage amount of a storage device is equal to or smaller than a predetermined charge requirement criterial threshold and a rotational speed of the output member is equal to or lower than a predetermined low vehicle speed criterial threshold determined on a basis of a preset provisional target rotational speed of the rotating electrical machine.

7. The control device according to claim 1, wherein the specific electric power generation control is performed at least in a low temperature state in which a temperature of a storage device is equal to or lower than a predetermined low temperature criterial threshold set on a basis of an internal resistance of the storage device.

8. The control device according to claim 1, wherein the target electric power generation amount is set on a basis of at least one of a storage amount of a storage device and an electric power consumption by an auxiliary installed in a vehicle.

* * * * *